US011381872B2

(12) United States Patent
Lidow et al.

(10) Patent No.: US 11,381,872 B2
(45) Date of Patent: *Jul. 5, 2022

(54) SYSTEMS AND METHODS FOR REDUCING DIGITAL VIDEO LATENCY

(71) Applicant: Xandr Inc., New York, NY (US)

(72) Inventors: Arel I. Lidow, New York, NY (US); Eric M. Hoffert, New York, NY (US); Alexander Krassel, Encino, CA (US); Vikki Pitts, Northridge, CA (US); Jeffrey Weiss, Chatsworth, CA (US); Andrew Sweeney, Brooklyn, NY (US); Matt Kendall, Denver, PA (US); Heran Yang, Brooklyn, NY (US); Jose Antonio Cabal-Ugaz, Brooklyn, NY (US)

(73) Assignee: Xandr Inc., New York, NY (US)

( * ) Notice: Subject to any disclaimer, the term of this patent is extended or adjusted under 35 U.S.C. 154(b) by 93 days.

This patent is subject to a terminal disclaimer.

(21) Appl. No.: 16/908,897

(22) Filed: Jun. 23, 2020

(65) Prior Publication Data

US 2020/0322674 A1    Oct. 8, 2020

Related U.S. Application Data

(63) Continuation of application No. 15/341,888, filed on Nov. 2, 2016, now Pat. No. 10,728,612.

(Continued)

(51) Int. Cl.
*H04N 21/438*    (2011.01)
*H04N 21/234*    (2011.01)
(Continued)

(52) U.S. Cl.
CPC ... *H04N 21/4384* (2013.01); *H04N 21/23424* (2013.01); *H04N 21/4331* (2013.01);
(Continued)

(58) Field of Classification Search
CPC ......... H04N 21/4384; H04N 21/23424; H04N 21/4331; H04N 21/4667; H04N 21/47202; H04N 21/4782; H04N 21/6543
See application file for complete search history.

(56) References Cited

U.S. PATENT DOCUMENTS 6,029,195 A      2/2000   Herz et al.
2002/0095332 A1*  7/2002   Doherty ............. G06Q 30/0601
                                                  705/14.53

(Continued)

OTHER PUBLICATIONS http://www.cnn.com/videos/world/2015/12/05/climate-change-conference-cop21-brazil-rio-de-janeiro-gmb.cnn. Video Functionality., Jan. 25, 2017, pp. 1-2.

(Continued)

*Primary Examiner* — Nathan J Flynn
*Assistant Examiner* — Christine A Kurien
(74) *Attorney, Agent, or Firm* — Guntin & Gust, PLC

(57) ABSTRACT

Examples of the systems and methods described herein relate to reducing latency issues associated with playing online digital video on client devices. An example method includes: determining that a client device of a user is displaying a web page; determining a likelihood that the user will select content on the web page associated with a digital video; and determining that the likelihood exceeds a threshold and, based thereon, performing at least one of the following steps before the user selects the content: initiating a mediation process to identify the digital video associated with the content; unwrapping a video tag associated with the digital video; storing at least a portion of the digital video on the client device; stitching the digital video together with a second digital video; and/or initializing a video player for displaying the digital video on the client device.

20 Claims, 9 Drawing Sheets

Related U.S. Application Data

(60) Provisional application No. 62/298,602, filed on Feb. 23, 2016, provisional application No. 62/298,570, filed on Feb. 23, 2016, provisional application No. 62/249,861, filed on Nov. 2, 2015.

(51) Int. Cl.
| | |
|---|---|
| *H04N 21/4782* | (2011.01) |
| *H04N 21/466* | (2011.01) |
| *H04N 21/472* | (2011.01) |
| *H04N 21/6543* | (2011.01) |
| *H04N 21/433* | (2011.01) |

(52) U.S. Cl.
CPC ..... *H04N 21/4667* (2013.01); *H04N 21/4782* (2013.01); *H04N 21/47202* (2013.01); *H04N 21/6543* (2013.01)

(56) References Cited

U.S. PATENT DOCUMENTS

| | | | |
|---|---|---|---|
| 2005/0084136 A1 | 4/2005 | Xie et al. | |
| 2008/0259906 A1* | 10/2008 | Shkedi | G06F 16/951 |
| | | | 370/352 |
| 2012/0155834 A1 | 6/2012 | Beacham et al. | |
| 2013/0298147 A1* | 11/2013 | Klein | H04N 21/2668 |
| | | | 725/13 |
| 2014/0115114 A1 | 4/2014 | Garmark et al. | |
| 2015/0130705 A1 | 5/2015 | Im | |
| 2016/0180762 A1* | 6/2016 | Bathiche | G06F 3/013 |
| | | | 345/174 |
| 2018/0143842 A1 | 5/2018 | Weiss et al. | |
| 2021/0258634 A1 | 8/2021 | Hoffert et al. | |

OTHER PUBLICATIONS

"AppNexus Announces Launch of Price Check, Header Bidding for Mobile Apps.", http://www.appnexus.com/company/pressroom/appnexus-announces-launch-of-pricecheck-header-bidding-for-mobile-apps, Jan. 26, 2016, pp. 1-3.

Eifler, A., "Realizing the Potential of Video (Pt. 2).", AppNexus Summit Europe 2015. at http://www.youtube.com/watch?v=5zf11G3s6Y0, 2015, pp. 1-2.

Freier, A., "AppNexus Launches Header Bidding for Mobile Apps.", Business of Apps. at http://www.businessofapps.com/appnexus-launches-header-bidding-for-mobile-apps/, Jan. 26, 2016, pp. 1-4.

Hoffert, E., "It's Time for a Revolution in Video Monetization Latency.", Medium. at http://medium.com/@erichoffert/it-s-time-for-a-revolution-in-video-monetization-latency-77b723f14b97. Last Accessed Jul. 24, 2018, Jan. 26, 2016, pp. 1-6.

Hoffert, E., "Realizing the Potential of Video (Pt.1).", AppNexus Summit Europe 2015 at https://www.youtube.com/watch?v=sI5OFOJTK0c. Last accessed Jul. 24, 2018, pp. 1-2.

Rich, C. , "A Comprehensive List of Online Video Ad Types and Formats, Pros and Cons.", Tubular Insights at http://tubularinsights.com/online-video-ad-types-formats/. Last accessed Sep. 13, 2016, pp. 1-16.

Schiff, A. , "AppNexus Tosses Its Mobile Header Bidding Solution in the Ring.", Ad Exchanger at https://adexchanger.com/mobile/appnexus-tosses-its-mobile-header-bidding-solution-into-the-ring/. Last accessed Jul. 24, 2018, pp. 1-3.

* cited by examiner

SYSTEMS AND METHODS FOR REDUCING DIGITAL VIDEO LATENCY

CROSS-REFERENCE TO RELATED APPLICATIONS

This application is a continuation of U.S. patent application Ser. No. 15/341,888 filed on Nov. 2, 2016, which claims the benefit of priority to U.S. Provisional Patent Application No. 62/298,602, filed Feb. 23, 2016 and U.S. Provisional Patent Application No. 62/298,570, filed Feb. 23, 2016 and U.S. Provisional Patent Application No. 62/249,861, filed Nov. 2, 2015. All sections of the aforementioned applications are incorporated herein by reference in their entirety.

BACKGROUND

This specification relates to online digital video and, in particular, to systems and methods for reducing latency issues associated with providing online digital video.

Viewers of online digital video often experience significant latency issues when digital videos are selected for viewing. After an online digital video is selected, for example, it can be several seconds (e.g., 5, 10, or 20 seconds) or more before the video begins playing on the user's computer or other client device. Some sources for the latency issues include poor Internet connections, inefficient identification or retrieval of video content, and/or improper functioning of digital video players. The end result is a system that requires users to wait a considerable length of time before online digital videos are initiated and ready for playing. Such delays can frustrate users and result in significant reductions in online digital video consumption.

There is a need for systems and methods that reduce latency issues associated with online digital video content.

The foregoing discussion, including the description of motivations for some embodiments of the invention, is intended to assist the reader in understanding the present disclosure, is not admitted to be prior art, and does not in any way limit the scope of any of the claims.

SUMMARY

Examples of the systems and methods described herein result in more efficient initiation and presentation of online digital video content. In some embodiments, the systems and methods can be used to predict a likelihood that a user will select online content associated with a digital video. When the likelihood exceeds a threshold, the systems and methods can take steps to identify and prepare the digital video content for viewing on the user's client device, before the user selects the online content. By taking such steps, the digital video can be ready for immediate display, once the content is selected. The end result is a more efficient and enjoyable digital video experience for the user.

According to an aspect of the present disclosure, a computer-implemented method of reducing digital video latency, is provided. The method includes determining that a client device of a user is displaying a web page; determining a likelihood that the user will select content on the web page, the content being associated with a digital video; and determining that the likelihood exceeds a threshold and, based thereon, performing at least one of the following steps before the user selects the content: initiating a mediation process to identify the digital video associated with the content; unwrapping a video tag associated with the digital video; storing at least a portion of the digital video on the client device; stitching the digital video together with a second digital video; and initializing a video player for displaying the digital video on the client device.

In some embodiments, determining the likelihood includes predicting a time at which the content will be accessible to the user. In some embodiments, the likelihood is determined based on a viewing history of the user, a viewing history of other users, a duration of the user's Internet session, and/or an Internet browser history. In some embodiments, the content is selectable by clicking the link, tapping the link, and/or viewing the content.

In some embodiments, the method includes initiating the mediation process to identify the digital video before the user selects the content. In some embodiments, the method includes unwrapping the video tag associated with the digital video before the user selects the content. In some embodiments, the method includes storing at least the portion of the digital video on the client device before the user selects the content. In some embodiments, the method includes stitching the digital video together with the second digital video before the user selects the content. In some embodiments, the method includes initializing the video player for displaying the digital video on the client device before the user selects the content.

According to another aspect of the present disclosure, a system is provided. The system includes a client device of a user. The client device includes data processing apparatus programmed to perform operations for reducing digital video latency. The operations include determining that the client device of the user is displaying a web page; determining a likelihood that the user will select content on the web page, the content being associated with a digital video; and determining that the likelihood exceeds a threshold and, based thereon, performing at least one of the following steps before the user selects the content: initiating a mediation process to identify the digital video associated with the content; unwrapping a video tag associated with the digital video; storing at least a portion of the digital video on the client device; stitching the digital video together with a second digital video; and initializing a video player for displaying the digital video on the client device.

In some embodiments, determining the likelihood includes predicting a time at which the content will be accessible to the user. In some embodiments, the likelihood is determined based on a viewing history of the user, a viewing history of other users, a duration of the user's Internet session, and/or an Internet browser history. In some embodiments, the content is selectable by clicking the link, tapping the link, and/or viewing the content.

In some embodiments, the operations include initiating the mediation process to identify the digital video before the user selects the content. In some embodiments, the operations include unwrapping the video tag associated with the digital video before the user selects the content. In some embodiments, the operations include storing at least the portion of the digital video on the client device before the user selects the content. In some embodiments, the operations include stitching the digital video together with the second digital video before the user selects the content. In some embodiments, the operations include initializing the video player for displaying the digital video on the client device before the user selects the content.

According to another aspect of the present disclosure, a non-transitory computer storage medium having instructions stored thereon is provided. When executed by data processing apparatus, the instructions cause the data processing apparatus to perform operations for reducing digital video latency. The operations include determining that a client device of a user is displaying a web page; determining a likelihood that the user will select content on the web page, the content being associated with a digital video; and determining that the likelihood exceeds a threshold and, based thereon, performing at least one of the following steps before the user selects the content: initiating a mediation process to identify the digital video associated with the content; unwrapping a video tag associated with the digital video; storing at least a portion of the digital video on the client device; stitching the digital video together with a second digital video; and initializing a video player for displaying the digital video on the client device.

In some embodiments, determining the likelihood includes predicting a time at which the content will be accessible to the user. In some embodiments, the likelihood is determined based on a viewing history of the user, a viewing history of other users, a duration of the user's Internet session, and/or an Internet browser history. In some embodiments, the content is selectable by clicking the link, tapping the link, and/or viewing the content.

Elements of embodiments or examples described with respect to a given aspect of the invention can be used in various embodiments or examples of another aspect of the invention. For example, it is contemplated that features of dependent claims depending from one independent claim can be used in apparatus, systems, and/or methods of any of the other independent claims.

The details of one or more embodiments of the subject matter described in this specification are set forth in the accompanying drawings and the description below. Other features, aspects, and advantages of the subject matter will become apparent from the description, the drawings, and the claims.

The foregoing Summary, including the description of advantages of some embodiments, is intended to assist the reader in understanding the present disclosure, and does not in any way limit the scope of any of the claims.

DETAILED DESCRIPTION

It is contemplated that apparatus, systems, and methods embodying the subject matter described herein encompass variations and adaptations developed using information from the examples described herein. Adaptation and/or modification of the apparatus, systems, and methods described herein may be performed by those of ordinary skill in the relevant art.

Throughout the description, where apparatus and systems are described as having, including, or comprising specific components, or where processes and methods are described as having, including, or comprising specific steps, it is contemplated that, additionally, there are apparatus and systems of the present invention that consist essentially of, or consist of, the recited components, and that there are processes and methods according to the present invention that consist essentially of, or consist of, the recited processing steps.

Figure 1:
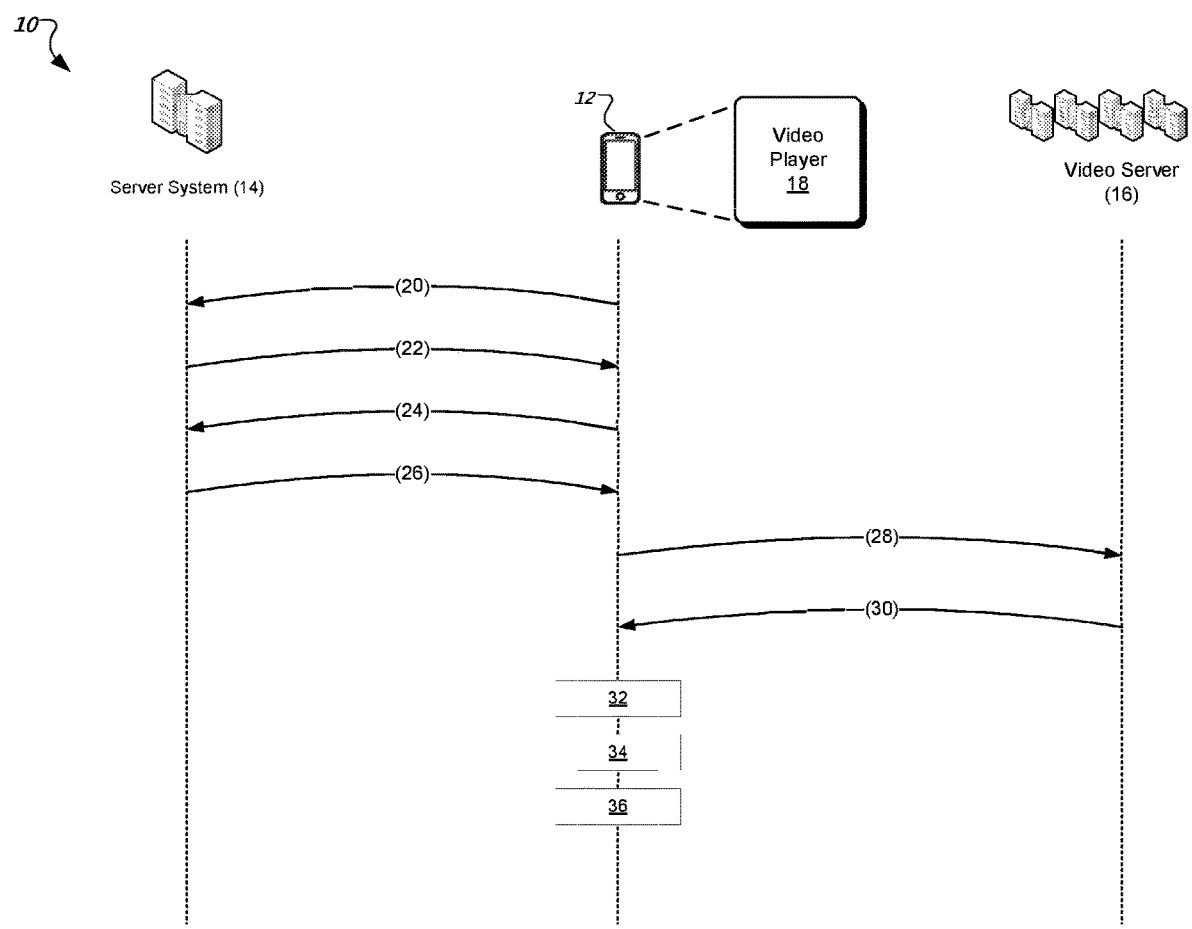
FIG. 1 is a schematic data flow diagram of an example method for viewing online digital video.

FIG. 1 is a data flow diagram of an example method 10 for providing (e.g., obtaining and displaying) a video on a client device. The method 10 is performed by a client device 12, which communicates with a server system 14 and a video server 16. The client device 12 includes or uses a video player 18 to display online video content on the client device 12. The video player 18 can be stored and/or executed on the client device 12. Alternatively or additionally, the video player 18 can be stored and/or executed external to the client device 12, such as on the server system 14 and/or on the video server 16.

To display a video on the client device 12, the client device 12 can send (step 20) a request for content to the server system 14. The request can be sent in response to certain activity by a user of the client device 12. For example, the user can open a web browser or application on the client device 12 and request online content. The request can be or include, for example, an address for a web page that the user is attempting to access. After receiving the request, the server system 14, can send (step 22) web page or other online content (e.g., in the form of an HTML file) to the client device 12. The user can then view the content (e.g., web page) on the client device 12 and may attempt to select or otherwise access a digital video accessible from the web page. When the user selects content (e.g., a link or window) associated with the digital video, the client device 12 can send (step 24) to the server system 14 an indication that the user has selected the content. In response, the server system 14 can send (step 26) a video tag back to the client device 12. The video tag may be or include, for example, data related to how the client device 12 can access the digital video. In certain examples, the video tag includes a network address of a video file containing the digital video (e.g., in a link to the video file) and/or includes data related to the digital video, such as information about a length or a format for the digital video. After receiving and processing the video tag, the client device 12 sends (step 28) a request to the video server 16 to access the video file and the digital video. The video server 16 can send (step 30) the video file to the client device 12.

After or before the video file is received by the client device 12, the client device 12 can load (step 32) the video player 18. The video player 18 processes (step 34) the video file, including any executable code or initial portions of the video file that are designated for processing before the digital video is displayed. The video player 18 is used to display (step 36) the digital video on the client device 12.

As discussed above, the process illustrated in FIG. 1 can result in significant latency between the time when a user selects a digital video for viewing and the time when a video player on the user's device begins playing the video. The inventors have recognized and appreciated that, in many cases, such latency can be reduced by eliminating one or more of the steps (20-36) illustrated in FIG. 1 and/or by initiating such steps sooner (e.g., before the user actually selects the digital video).

Figure 2:
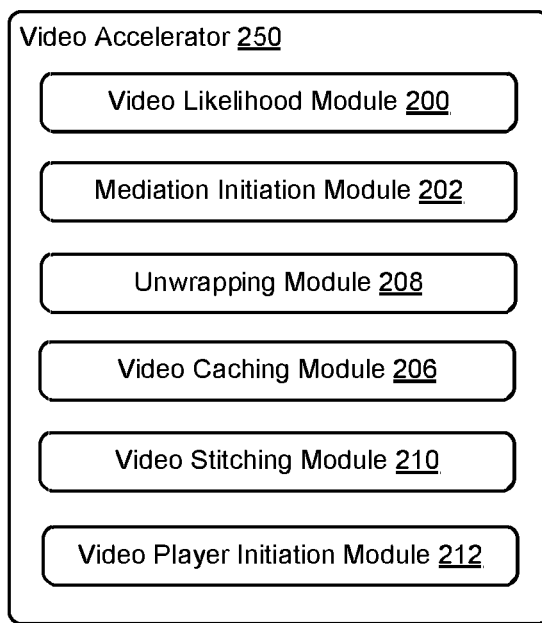
FIG. 2 is a schematic diagram of an example video accelerator that includes multiple modules for reducing latency associated with online digital video, in accordance with some embodiments.

FIG. 2 is an example video accelerator 250 that includes or utilizes various modules for reducing or eliminating latency issues associated with online digital video. The modules can be implemented in software, hardware, or combinations thereof, and can use processors associated with one or more servers and/or client devices. The video accelerator 250 can reside on or be processed with a server system and/or a client device (e.g., the client device 12), as described herein.

For ease of understanding, the operations of the video accelerator 250 are generally described below in the context of a scenario in which a user who is viewing a web page on a client device selects digital content associated with an online digital video, which is subsequently displayed by a video player on the client device. However, one of ordinary skill in the art will appreciate that the techniques described herein are also applicable to other scenarios, including, without limitation, scenarios in which digital content associated with an online digital video is automatically selected on the user's behalf (e.g., by the user's device or by other devices in communication with the user's device), scenarios in which the user is viewing digital content other than a web page (e.g., digital content associated with a mobile app), etc.

In the depicted example, the video accelerator 250 includes or utilizes a video likelihood module 200, a mediation initiation module 202, a video caching module 206, an unwrapping module 208, a video stitching module 210, and a video player initiation module 212. In general, the video likelihood module 200 may be used to determine a likelihood that digital content associated with an online digital video will be selected (e.g., by the user). The likelihood can then be compared to a threshold value (e.g., 10%, 25%, 50%, or 75%), which can be determined and/or specified by providers (e.g., owners, operators, and/or publishers) of the digital content (e.g., web page) being viewed by the user, for example. When the likelihood exceeds the threshold value, the video accelerator 250 can coordinate the performance of various tasks for reducing or eliminating latency associated with displaying a digital video associated with the selected digital content. In this way, when the digital content associated with the online digital video is selected, there may be little or no delay before the digital video is displayed for the user (e.g., on the client device 12).

Figure 3:
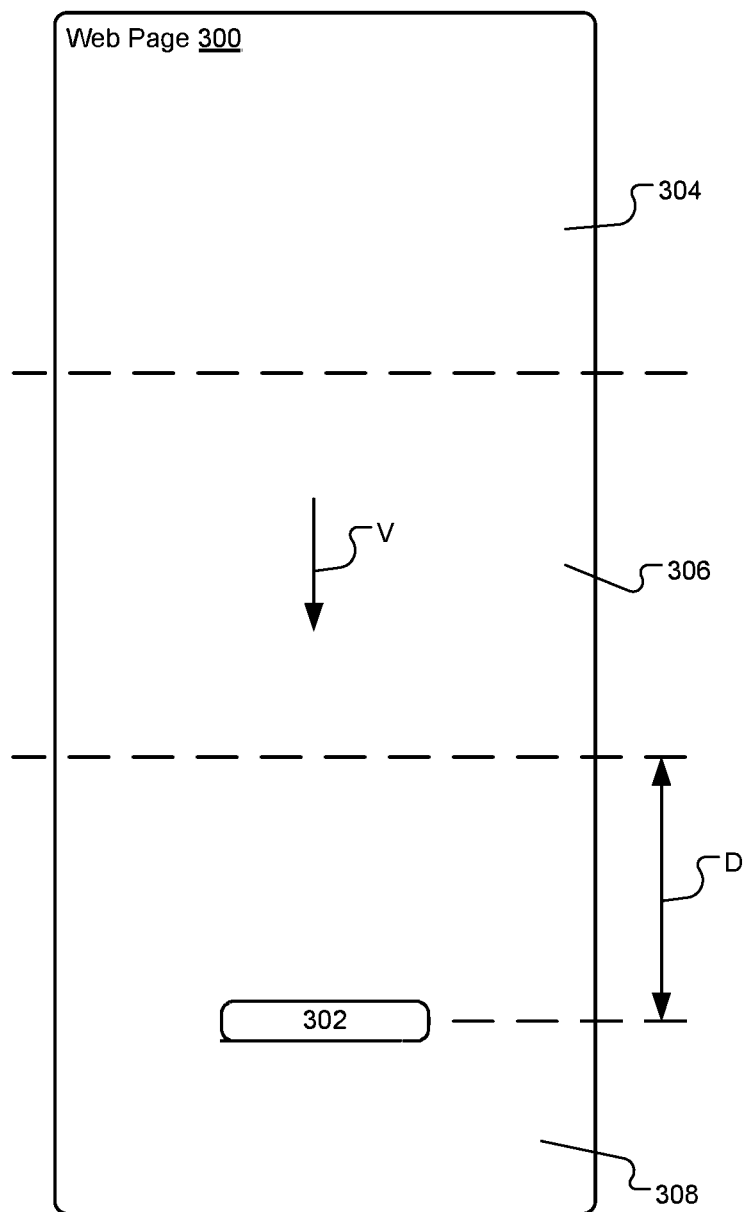
FIG. 3 is a schematic diagram of an example web page having content associated with a digital video, in accordance with some embodiments.

FIG. 3 is a schematic diagram of an example web page 300 that includes digital content 302 associated with an online digital video. The content 302 can be or include, for example, a link, an image, a video player, a play button on a video player, a portion of the web page reserved for or associated with a video player, another user interface component, and/or other data that, when selected, initiates a process for displaying a digital video on a client device. A user can select the content 302 by, for example, tapping a touch screen or clicking a mouse associated with the client device. In some embodiments, the content 302 can be selected automatically (e.g., simply by being partially or fully displayed on the client device). In that case, for example, an online digital video or other information may be automatically presented when the content 302 is displayed, without further interaction from the user.

In the depicted example, the web page 300 includes a top portion 304 that has already been viewed by the user on the client device, a middle portion 306 that is presently being viewed by the user, and a bottom portion 308 that has not yet been viewed by the user and that includes the content 302. To determine a likelihood that the content 302 will be selected, the video likelihood module 200 can estimate a time it will take before the user reaches the content 302. The time can be determined, for example, based on a distance D between the middle portion 306 and the content 302 and/or based on a velocity V at which the user is scrolling through the web page. The distance D may be measured in inches, cm, pixels, or a percentage of web page length, for example. The velocity V may be measured in inches/sec, cm/sec, pixels/sec, or a percentage of web page length per second, for example. In certain implementations, the time until the user reaches the content is 302 is determined from time=D/V. In general, the predicted time increases as the distance D is increased and/or as the velocity V is decreased. In various instances, when the predicted time is large, it is less likely that the user will select the content 302, because the user may lose patience and/or become distracted and may never reach the content 302. In one example, a mouse pointer velocity and/or a distance between a mouse pointer and the content 302 can be used to predict a likelihood that the user will select the content 302.

Alternatively or additionally, the video likelihood module 200 can determine the likelihood that the user will select the content 302 based on other factors, including: a viewing history of the user, a viewing history of other users, a duration of the user's Internet session, and/or an Internet browser history. For example, if the user has historically accessed information (e.g., related to sports, politics, current events, or breaking news) that is similar to information associated with the content 302, the determined likelihood that the user will select the content 302 can be higher. Likewise, if other users have shown a tendency to select the content 302, the determined likelihood that the current user will also select the content 302 can be higher. Further, if the user's Internet session has just begun, the determined likelihood that the user will select the content 302 can be higher, given that the user is more likely to be focused on the Internet session and/or seeking information similar to the content 302. Further, the user's Internet browser history may indicate that the user recently performed a search for information associated with the content 302 and/or selected a link that directed the user to the content 302. In such instances, the determined likelihood that the user will select the content 302 can be high, given that the user is probably looking for the content 302. Viewing histories and Internet browser histories can be stored locally on the client device and/or in one or more databases associated with a server system, as described herein.

In some examples, the video likelihood module 200 uses machine learning to predict the likelihood that the user will select the content 302. The training data for a machine learning classifier or other predictive model can be or include, for example, information related to the distance D, the velocity V, the predicted time until the user reaches the content, the viewing history of the user and/or other users, the duration of the user's Internet session, the user's browser history, and/or whether or not the user selected the associated content 302. The video likelihood module 200 or other components of the systems and methods described herein can monitor and collect such information for multiple users and train one or more predictive models. The predictive models may be or include, for example, one or more linear classifiers (e.g., Fisher's linear discriminant, logistic regression, Naive Bayes classifier, and/or perceptron), support vector machines (e.g., least squares support vector machines), quadratic classifiers, kernel estimation models (e.g., k-nearest neighbor), boosting (meta-algorithm) models, decision trees (e.g., random forests), neural networks, and/or learning vector quantization models. Other predictive models can be used.

Once the video likelihood module 200 determines the likelihood that the user will select the content 302, the video likelihood module 200 compares the likelihood with the threshold value. If the likelihood exceeds the threshold value, the video likelihood module 200 can instruct the video accelerator 250 and/or other system components (e.g., modules 202, 206, 208, 210, and/or 212) to prepare for possible selection of the content 302 and presentation of the digital video. The video accelerator 250 and/or the other system components can then take action to reduce latency associated with the digital video, as described herein.

In some examples, the video likelihood module 200 can determine that the likelihood of the content 302 being selected is sufficiently high based on one or more heuristics, without actually calculating the likelihood of the content 302 being selected or comparing that likelihood to a threshold value. For example, the video likelihood module 200 can determine that the likelihood of particular content C being selected is sufficiently high if (1) the client device loads a web page that includes the content C, (2) the user selects a link to a web page that includes the content C, (3) the user launches a mobile app that includes the content C, (4) the user accesses a portion of a mobile app (e.g., a particular portion of a user interface for the mobile app) that includes the content C, and/or (5) the user accesses one or more other items of content related to the content C, etc. If the likelihood of the content C being selected is sufficiently high, the video likelihood module 200 can instruct the video accelerator 250 and/or other system components (e.g., modules 202, 206, 208, 210, and/or 212) to prepare for possible selection of the content 302 and presentation of the digital video. The video accelerator 250 and/or the other system components can then take action to reduce latency associated with the digital video, as described herein.

Referring again to FIG. 2, in certain instances, the mediation initiation module 202 is instructed to initiate a mediation process before the user selects the content 302. In general, the mediation process is used to identify a digital video to be played on the user's client device, once the associated digital content 302 is selected. In some embodiments, the mediation process involves communicating with a remote server (e.g., the web server or other server that provided the web page and the associated content 302). For example, the user's client device may send a message to the remote server, requesting that the remote server identify the online video to be displayed when the associated content 302 is selected, and the remote server may respond with a message identifying the video to be displayed.

In some embodiments, the mediation process involves not only identifying the video to be displayed, but also determining which video to display, because multiple videos may be associated with the content 302. For example, a remote server (e.g., the web server or other server that provided the web page and the associated content 302) may determine the video to be displayed based on attributes of the user, which may be represented by data included in the client device's message to the remote server. Alternatively or in addition, the mediation process can include, for example, initiating an online auction with online bidders, in which each bidder offers to pay a monetary amount in exchange for playing the bidder's digital video on the client device. When one of the offers is accepted (e.g., by an owner or publisher of the web page 300, or by an auction operator), the digital video associated with the offer can be identified as the digital video that will be played on the client device, once the content 302 is selected. Such auctions may be performed, for example, when the content 302 is or includes a video advertisement player, and in such cases the identified digital video can be a specific video advertisement. Alternatively or additionally, the digital video to be displayed can be determined based on a look-up chart or other data linking the content 302 and the digital video.

In some examples, the mediation process may result in the user's client device obtaining a "video tag" or "video serving tag" (VST). The video tag can include data identifying a video file (which may contain a digital video, e.g., the digital video to be played on the client device, once the user selects the content 402), a network address of the video file, and/or other data associated with the video (e.g., a length and/or a format for the video). As described herein, the video file can include executable code or other data designated for processing before the digital video is displayed. In some embodiments, execution of such code or processing of such data may result in the initiation of another mediation process, which may result in the user's client device obtaining another video tag. This process (sometimes referred to herein as "unwrapping") of obtaining a video tag, obtaining the video file identified by the tag, and executing code or processing data in the video file may be repeated one or more times, until the client device actually obtains a video file containing the video to be displayed. The unwrapping process can be time-consuming and can contribute to latency issues.

To reduce or avoid such latency issues, the unwrapping module 208 is configured to initiate the unwrapping process before the user selects the content 302. The unwrapping module 208 is preferably able to complete the unwrapping process before the user selects the content 302, such that the digital video is identified, obtained by the client device (e.g., received, downloaded from a server, etc.), and ready for playing before the content 302 is selected. In some instances, the unwrapping module 208 stores data extracted from the video tags obtained from the unwrapping process. That way, when the same video tag is encountered again in the future, the unwrapping module 208 can access the stored information, rather than performing the unwrapping process again.

Alternatively or additionally, the video caching module 206 can be instructed to store at least a portion of the identified digital video on the client device of the user. With the digital video or portions thereof stored on the client device, the digital video can be accessed or played more quickly, once the content 302 is selected. In various examples, the video caching module 206 receives the digital video to be cached from one or more other modules, such as the mediation initiation module 202 and/or the unwrapping module 208.

In various instances, once the digital video to be played has been identified, the video stitching module 210 can combine or stitch the digital video together with one or more other videos. For example, when the user selects the content 302 in an effort to watch a particular video, the user may do so with the understanding that one or more video advertisements will be played before playing the particular video, at intermittent times after playing portions of the particular video, or after playing the particular video in its entirety. When two or more videos are played, latency issues can be reduced by stitching the videos together into a single video. This stitching technique allows the video player on the client device to proceed seamlessly from one digital video to the next, without transitioning from loading and playing one video to loading and playing the next video. In some examples, the video stitching module 210 can obtain the digital videos or data identifying the digital videos from other modules (e.g., the mediation initiation module 202, the unwrapping module 208, and/or the video caching module 206). The video stitching module 210 is preferably able to stitch the videos together before the user selects the content 302, such that the combined video is ready for playing before the content 302 is selected.

Alternatively or additionally, in some examples, the video player initiation module 212 can be used to initiate the video player on the client device before the user selects the content 302. This can help reduce or eliminate delays associated with initializing the video player, which can contribute to overall digital video latency issues. In some implementations, the video player is fully activated and ready to play the digital video before the user selects the content 302.

Figure 4:
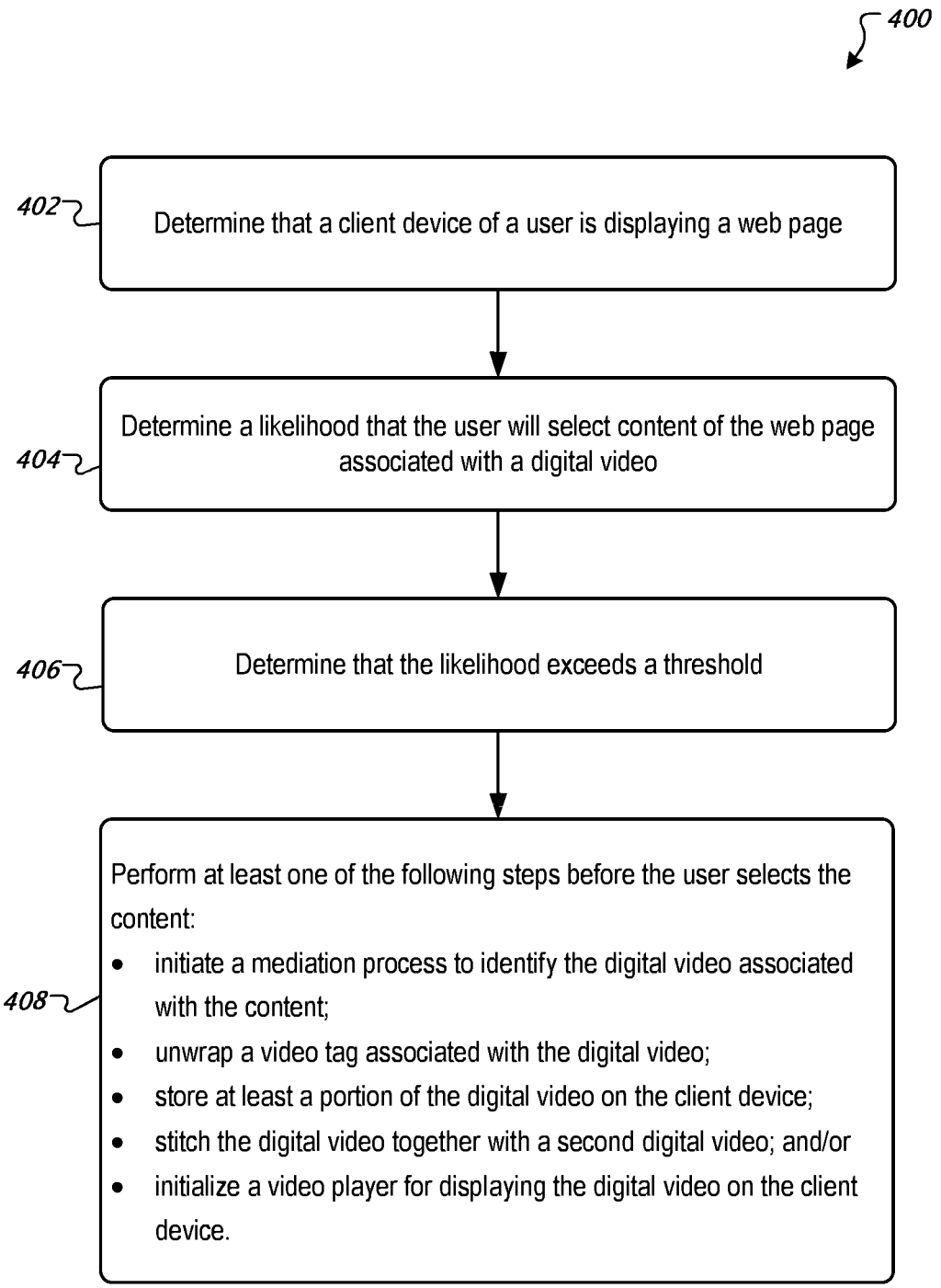
FIG. 4 is a flowchart of an example method for reducing or eliminating latency issues associated with online digital video, in accordance with some embodiments.

FIG. 4 is a flowchart of an example method 400 of reducing digital video latency. The method includes determining (step 402) that a client device of a user is displaying a web page or other digital media. A likelihood of selection (e.g., by the user) of content of the web page associated with online video is determined (step 404). Some examples of such content are described above. A determination is made (step 406) that the likelihood of selection exceeds a threshold (or that the likelihood of selection is sufficiently high) and, based thereon, at least one of the following steps is performed (step 408), before the content is selected: initiating a mediation process to identify a digital video associated with the content; unwrapping one or more video tags associated with the digital video; storing at least a portion of the digital video on the client device; stitching the digital video together with a second digital video; and initializing a video player for displaying the digital video on the client device. Advantageously, the method 400 reduces or eliminates latency issues associated with playing the digital video on the client device. In preferred examples, the digital video begins playing instantaneously or nearly instantaneously, once the content is selected.

In some embodiments, the video acceleration techniques described herein are applied to a system for online advertising. In various examples, a system for online advertising can deliver promotional messages to consumers using visual and/or audio advertisements (or "ads") in web pages. A publisher can include an ad space or other region in a web page (or other electronic document) where an advertisement can be placed. When the web page is displayed in a browser, an ad or "creative" (e.g., an image, audio, or video advertisement or other presentation) can be dynamically retrieved from an ad server for an advertiser and displayed in the ad space. The act of serving a creative on a web page can be referred to as an impression.

A publisher's ad space inventory is a collection of one or more ad spaces on web pages served by the publisher. Publishers can sell their ad space inventories to advertisers and/or can participate in auctions with advertisers in which selling and buying of ad space inventories take place. Auctions can be conducted by an ad network or ad exchange that serves as a broker between one or more publishers and a group of advertisers.

Selling and buying ad spaces can be based on pricing or payment models, such as cost per thousand impressions (CPM), cost per click (CPC), and cost per action or acquisition (CPA). In the CPM model, advertisers typically pay for every impression, and the price paid for each impression can be measured in price per 1000 ("mille") impressions. In the CPC model, advertisers typically pay each time a viewer clicks on their advertisement. In the CPA model, advertisers typically pay for every sale, registration or other action completed as a result of viewers clicking on their advertisements.

Figure 5:
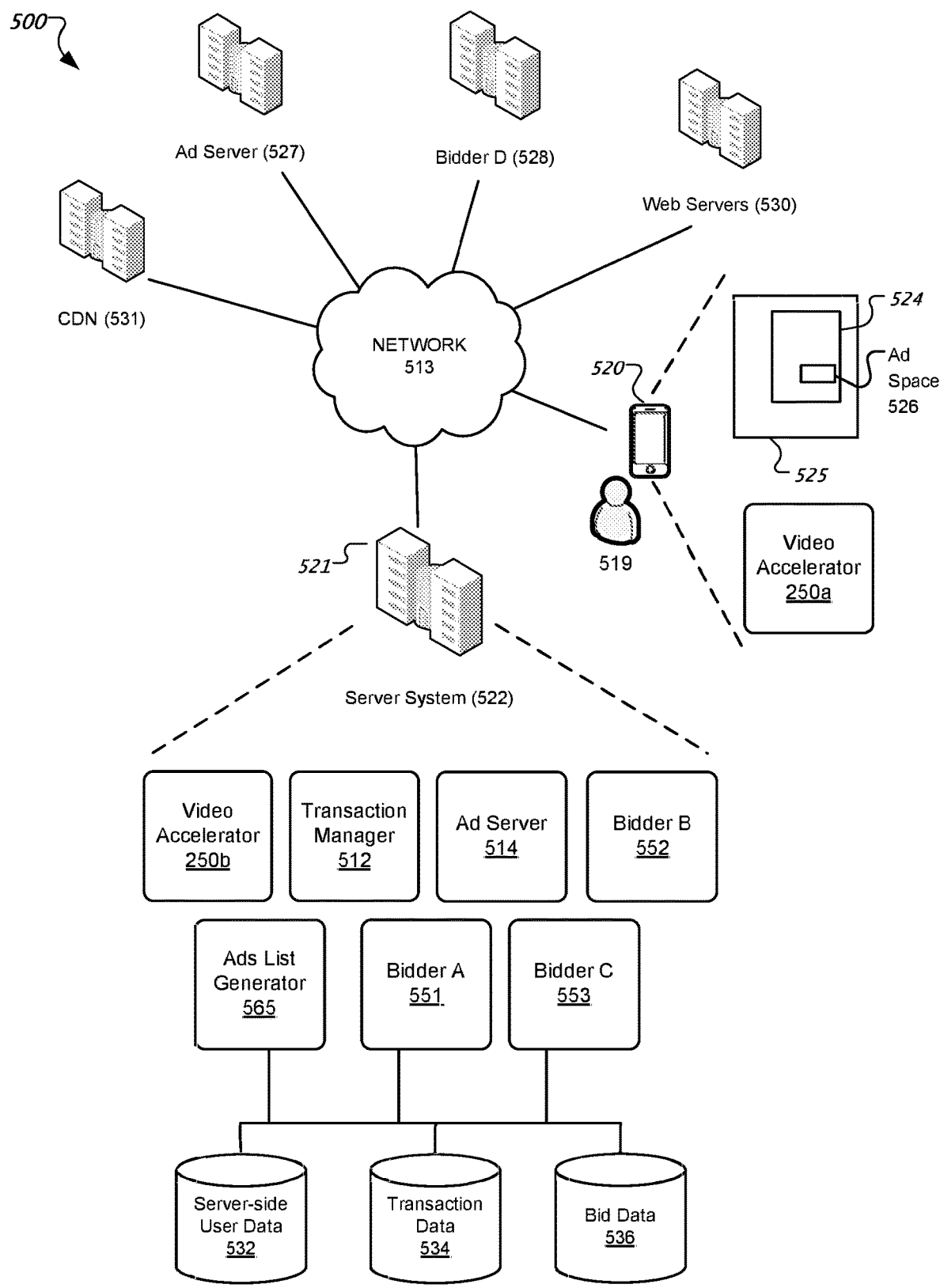
FIG. 5 is a schematic diagram of an example system including a video accelerator for reducing latency associated with online digital video, according to some embodiments.

FIG. 5 illustrates an example system 500 for online advertising, including a client-side video accelerator 250a and/or server-side video accelerator 250b for reducing latency associated with online video advertisements. A server system 522 provides functionality for real-time ad space auctions. The server system 522 includes software components and databases that can be deployed at one or more data centers 521 in one or more geographic locations, for example. The server system 522 software components may include one or more components of a video accelerator 250b, a transaction manager 512, an ad server 514, one or more bidders (e.g., bidder A 551, bidder B 552, and bidder C 553), and ads list generator 565. The server system 522 can also include one or more software components or tools for load balancing and/or security. The load balancing tools can manage traffic within a single data center or between multiple data centers. The security tools can manage data protection and access privilege for tenants served by the data centers 521. As described herein, the video accelerator 250 includes various modules for reducing latency associated with viewing online digital video, which are used by the system 500 to reduce latency associated with viewing online video advertisements. For example, the video accelerator 250 and its modules can be implemented in the client-side video accelerator 250a and/or the server-side video accelerator 250b. The software components can include subcomponents that can execute on the same or on different individual data processing apparatus. The server system 522 databases include a server-side user data database 532, transaction data database 534, and bid data database 536. The databases can reside in one or more physical storage systems. The software components and databases will be further described below.

The transaction manager 512 ("impression bus" or simply "Imp Bus") is an auction system that facilitates the transaction aspects of ad space inventory and impression trading between buyers and sellers. A buyer can be an advertiser (e.g., a credit card company, a sportswear company), an ad network, or an advertising agency, for example. Other buyers are possible. A seller can be a publisher (e.g., newspaper or social network), an online streaming or gaming service, or an ad network. Other sellers are possible. The transaction manager 512 processes ad requests received from web browsers or other software applications displaying content from publishers, sends relevant information to advertisers, conducts auctions (e.g., on behalf of sellers), returns creatives to the browsers or other applications, keeps track of billing and usage for advertisers and publishers, returns auction-result data, and enforces quality standards, for example. The transaction manager 512 can also coordinate the performance of various tasks to reduce or eliminate latency issues associated with online digital videos, as described herein. The transaction manager 512 stores in the transaction data database 534 various transaction information for each ad space that is transacted by the transaction manager 512 or other software components of the server system 522.

The ad server 514 is a software component that serves creatives to web pages or other applications. The ad server 514 can also make decisions about which creatives to serve, and track clicks or other user interactions with creatives, for example. A creative can be a visual or audio advertisement such as an image, an animation, a video clip, or an audio clip. Other types of a creative are possible.

A bidder system or bidder (e.g., bidder A 551) is a software component that, on behalf of a buyer, performs bidding operations. The bidder takes various pieces of bid-specific information (e.g., maximal bid price, target user areas or segments, start and end dates, budget) as input and generates a bid for a particular item of an ad space inventory, for example. A buyer can set up (e.g., through an API or web pages provided by the server system 522) a campaign targeting an ad space inventory with a set of bid-specific information for the ad space inventory and store the bid-specific information in bid data database 536. In some implementations, a bidder can be remote from the server system 522, such as bidder D 528. Here, an ad space inventory can be a collection of one or more ad spaces on web pages served by a publisher's web site. An ad space inventory can also be a collection of one or more ad spaces in user interfaces presented by a software application published by a publisher. Other types of ad space inventories are possible.

The transaction manager 512 conducts an auction when receiving an ad request for filling an available ad space. By way of illustration, a graphical user interface 524 of a software application 525 executing on client device 520 of a user 519 can include an ad space 526 and a corresponding ad tag. The application 525 can be a web browser application, or a software application such as a game application or a maps application. For instance, a web page displayed in a browser window of a web browser (e.g., running on a personal computer) can include an ad space on the web page and a corresponding ad tag. By way of illustration, the ad space can appear at the bottom of the user interface (a "banner ad") with a corresponding ad tag. Other examples of ad spaces are possible, including, without limitation, linear video ads, in-stream video ads (e.g., pre-roll, mid-roll, or post-roll in-stream video ads), interactive video ads, out-of-stream ("out-stream") video ads, overlay video ads, etc. Here, the client device 520 can be a mobile phone, a smartwatch, a tablet computer, a personal computer, a game console, or an in-car media system. Other examples of a client device are possible.

In some implementations, an ad tag includes a Uniform Resource Locator (URL) from which an ad will be requested (e.g., a URL for the server system 522), Hypertext Markup Language (HTML) statements, and/or JavaScript instructions for retrieving and displaying a creative (e.g., displaying the creative in a 160×600 iframe). The application 525 running on the client device 520 can retrieve content in the user interface 524 (e.g., a web page) through one or more data communication networks 513 such as the Internet, for example, from web servers 530 of a publisher. The ad tag causes the application 525 to send (e.g., through the networks 513) an ad request ("ad call") to the server system 522. In some implementations, the application 525 sends an ad request to the server system 522 via another advertising server system such as an ad exchange. The ad request can include information about the available ad space 526 (e.g., a size for the ad space, an identifier for the publisher), user information (e.g., an identifier of the user 519, an Internet Protocol or IP address), and system information (e.g., types of the browser and the client device), for example. The ad request can be composed in JavaScript Object Notation (JSON) or Extensible Markup Language (XML) format and transmitted to the server system 522 using Hypertext Transfer Protocol (HTTP) protocol (e.g., using HTTP POST request method). Other ad request formats and transmission methods are possible.

In response to the ad request, the transaction manager 512 can access the server-side user data store database 532 based on the user's identifier (if available), and retrieve available information about the user (e.g., user segment information such as age, gender, interests, or location). The transaction manager 512 generates a bid request including information about the ad space, the user, and so on, and sends the bid request to multiple bidders such as bidder A 551 and bidder B 552. The transaction manager 512 can also send the bid request through the networks 513 to servers of bidder D 528, which is external to the server system 522. The bid request can be composed in JSON format and sent to bidders using HTTP POST. The bid request can also be encoded or compressed. Other bid request formats and transmission methods are possible.

Each bidder can determine an appropriate bid based on its own requirements (e.g., budget, targets in placements) and, if desired, submit a bid response including a bid price and an identifier of a creative to be served, for example, to the transaction manager 512. The transaction manager 512 determines a winning bid (e.g., a highest bid) among bid responses received within a specified time period (e.g., 100 milliseconds). The transaction manager 512 then returns a creative of the winning bid to the client device 520, causing the application 525 to display the creative in the ad space in the user interface 524. The transaction manager 512 can also return a URL for a creative of the winning bid to the client device 520, causing the application 525 on the client device 520 to retrieve the creative from an ad server (e.g., ad server 514, or ad servers 527 external to the server system 522), or from servers of a content distribution network (CDN) 531. In various implementations, the transaction manager 512 can store in the transaction data database 534 transaction information such as an identifier of the creative served to the ad space, an identifier of the winning buyer, the user's identifier, the winning bid price, an identifier of the ad space, an identifier of the seller of the ad space, and a time stamp. The winning bid price (i.e., the price paid by the winning buyer) can be the bid price submitted by the winning buyer, or a second highest bid price of the auction as determined by Vickrey auction or other second-price auction mechanisms. Other types of transaction information are possible.

In comparison to display ads (e.g., ads in text, images or animations), video ads can command higher prices. However, video ads often take a long time to load into a webpage, largely because of the time required for a server (e.g., an ad network) to select a video ad and for the client device 520 to obtain the video ad and load the video ad in a video player. Particular implementations described in this disclosure describe methods for acquiring video ads and/or other online video content on the client-side. A computer program or computer-executable instructions on a client device can acquire video ads and decide on a best-available video ad to present in a web page. The programs or instructions can asynchronously acquire and cache the video ad or other video before a user views the video (e.g., before the user presses a "play" button or otherwise interacts with a video player), thus providing a better user experience. For example, a process could run asynchronously on a first web page to acquire and cache a video ad and then use the results on a second web page later (e.g., many seconds later) when the video is instantly available. Likewise, a process could run asynchronously to acquire three video ads at the commencement of a pre-roll video ad in a linear video stream and then use the results when all three ads are needed in a mid-roll ad pod.

Figure 6:
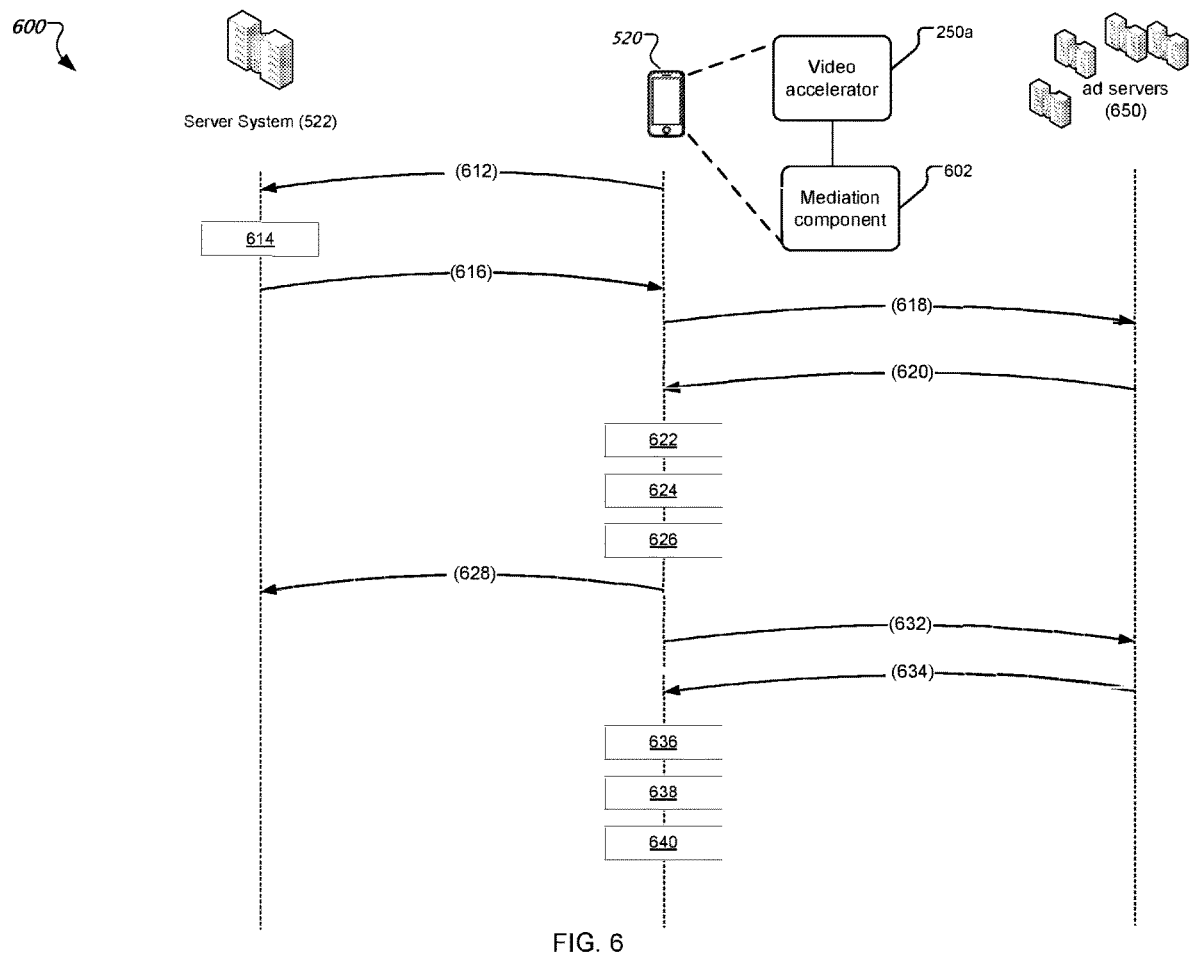
FIG. 6 is a schematic data flow diagram of an example method for using the system of FIG. 5 to reduce latency associated with online digital video, according to some embodiments.

FIG. 6 is a data flow diagram of an example method 600 for client-side video ad mediation. The method 600 can be implemented by a computer-executable mediation component 602 that executes on the client device 520, for example. The mediation component 602 can implement, for example, ad auction functionality. By way of illustration, the user interface 524 can be a web page (or a structured document), and the mediation component 602 can include JavaScript instructions in the header or body of the web page. In some implementations, the mediation component 602 can be invoked via an ad tag of an ad space (e.g., the ad space 526) in the web page, for example. In some implementations, the mediation component 602 can be invoked by the mediation initiation module 202 of the video accelerator 250a. In one example, the mediation initiation module 202 invokes the mediation component 602 upon receiving suitable instructions from the video likelihood module 200. For example, the mediation initiation module 202 may invoke the mediation component 602 upon initialization of a video ad player (e.g., in accordance with the Video Player-Ad Interface Definition (VPAID) (e.g., using VPAID Init)). Initiating client side mediation (e.g., invoking client-side video auction logic) in response to initialization of the video ad player (e.g., in the VPAID initialization block, separate from video viewing code) can avoid lengthy loading or spinning icon indicators from appearing in a blank video player. In one implementation, the mediation process is performed in advance of a user hitting the play button, for example, during loading of the web page. This allows the lengthy mediation, tag unwrapping, video caching, and/or video player initiation processes to occur in a manner not visible to a user and/or before the user selects the play button or other content. This type of logic can be used, for example, with out-stream video, where video appears on an article page between paragraphs of text, or with in-stream video. Once the video acceleration process is completed, the results can then be used, for example, within the same Flash virtual machine in a subsequent VPAID Start Ad step for a rapid video playback experience.

In FIG. 6, the mediation component 602 makes a request (step 612) to the server system 522 for an ad (e.g., a video ad) to be presented in the ad space 526. The mediation component 602 can make the request, for example, when the user 519 navigates to the user interface 524 and/or prior to user interaction with a video player. In addition to ad space information, user information, and system information described earlier, the ad request can include an indication for requesting a video ad and/or an identification of an available video player for playing video ads. A video player can be in a web browser or in an application (e.g., the user interface 524) that supports HTML or video elements, for example. Other types of video players are possible. For instance, a video player can be or include code (e.g., a "plug-in" in a web browser) that can be used to play videos.

In one implementation, after receiving the ad request, the ads list generator 565 of the server system 522 creates a ranked list of ads for the ad request (step 614). The ads list generator 565 can first identify a set of available ads (creatives). The available ads can include ads that are part of an existing agreement between a seller associated with the ad space 526 and a buyer. One or more available ads can also be from a real-time ad space auction (e.g., a real-time bidding (RTB) auction performed on RTB servers in server system 522). The ads list generator 565 can access transaction data stored in the transaction data database 534 and rank the available ads based on each ad's past performance (e.g., a number of impressions or click events over a period of time) for the ad space 526 (or for an ad space inventory including the ad space 526). Other methods for identifying and ranking available ads are possible. The ads list generator 565 can generate a ranked list of ads including top-ranked ads (e.g., the top 20 ads), for example. The ranked list can be an ordered array of ads composed in XML or another structured language, for example. Each ad in the ranked list can be specified by a web address of an ad server (or a link to another ad server) from which a creative can be retrieved. In some implementations, the list of ads is not ranked or in any particular order.

The server system 522 then sends the ranked list of ads (step 616) to the user interface 524 of the client device 520. After receiving the ranked list of ads, the mediation component 602 sends an ad request (step 618) to each of the ad servers 650 specified in the ranked list. The ad request can include information about the ad space 526, user information, and system information. The ad request can also include an indication for requesting a video ad. The ad request can also include bid information such as a minimal bid price. The ad request can be composed in JSON or XML format and transmitted to the ad servers 650 using HTTP POST protocol, for example. Note that the mediation component 602 can send the ad requests to the ad servers 650 in parallel. In some implementations, the mediation component 602 can send the ad requests to the ad servers 650 asynchronously (e.g., before the user interface 524 loads other content to be presented in the user interface 524, or before the user 519 navigates to a location near the ad space 526). In this way, an ad (e.g., a video ad) can be ready to be presented in the ad space 526 when the user 519 navigates to a location where the ad space 526 is visible (e.g., within a view port of the user interface 526). When the ad space 526 includes a video player with pre-roll, mid-roll, and/or post-roll advertising content in connection with video content desired to be viewed by the user, asynchronous ad requesting (e.g., by the mediation component 602 when invoked by the mediation initiation module 202) and video caching (e.g., by video caching module 206) can achieve a seamless transition among advertising content and desired video content by having the auction (if any) run and the advertising content downloaded prior to the user pressing "play" or prior to reaching a point in the desired video content where the advertising content will be shown (e.g., the media process for a mid-roll advertisement can be run prior to the user reaching the mid-roll). The process can run just prior to when it is needed, or well in advance of when it is needed. For greater efficiency, the process can be run close to the point in time when the video or ad is needed, in order to ensure a high probability that the user will in fact watch the ad. As described above, a video likelihood module 200 of the video accelerator 250a can be used to determine the time at which to acquire the videos or ads in advance of usage (e.g., based on a predictive model (e.g., one or more classifier algorithms), user behavior, auction running times, etc.).

After receiving the ad requests (step 618), each of the ad servers 650 can send a response (step 620) back to the mediation component 602, or can provide no response at all.

A response from an ad server 650 can be a creative for a display ad. A response for a video ad can include, for example, a video creative or a "wrapper" (e.g., a Video Ad Serving Template (VAST)) that specifies a network address of another server from which a video creative can be retrieved. A response can also include pricing information associated with a creative such as a bid price (e.g., $0.05) and a payment model (e.g., CPM) that a buyer is willing to pay for the ad space 526. A response from an ad server 650 can also include an error message. Other types of response messages from the ad servers 650 are possible. A video creative can be in VPAID, Moving Picture Experts Group (e.g., MPEG or MPEG-4), Flash Video, WebM, or Ogg file format. Other file formats for a video creative are possible.

After receiving responses from the ad servers 650, the video accelerator 250a processes the responses (step 622) for presentation of a video ad in the ad space 526. More particularly, the unwrapping module 208 unwraps each wrapper response (e.g., by identifying in the wrapper response a network address of an ad server for a video creative and retrieving the video creative from the ad server, etc.). Unwrapping the wrapper responses may yield multiple redirects, which can slow down the process of obtaining a video ad and increase latency. In some embodiments, multiple wrapper responses can be unwrapped asynchronously while calling out each of the different networks in parallel to complete this process more quickly. The unwrapped contents of the wrappers (e.g., the parsed contents of the VAST tags) can be cached in local storage for quick lookup, thereby avoiding the need for slower redirects when processing the same wrappers in the future. The video accelerator 250a can stop receiving responses after a pre-determined time-out period (e.g., 500 milliseconds) if video creatives are still not yet available, such as when there is no response from a particular ad server. This can help to greatly reduce overall latency in the video ad selection process.

The mediation component 602 then selects a particular video creative from the retrieved video creatives and stores the selected video creative locally (step 624) (e.g., using the video caching module 206), such that the video is available prior to the user's need to view it. The mediation component 602 can select from the retrieved video creatives a particular one that is ranked highest in the ranked list 616. As described earlier, each response 620 can include a bid price. The mediation component 602 can select from the retrieved video creatives a particular one that has the highest bid price (e.g., the winning bid). In some implementations, the mediation component 602 selects from the retrieved video creatives one that has the highest bid price and meets a pre-determined floor price. In this way, the mediation component 602 on the client device 520 can mediate and select a video creative, without relying on a server (e.g., an ad exchange, an ad network) for selecting a video creative.

If no video creatives are available (e.g., no response from ad servers 650), the mediation component 602 can select a display ad. The mediation component 602 can also select a display ad that can be used in place of a selected video ad after the selected video ad has been presented, as will be described in more detail below. The mediation component 602 may select a display ad if the display ad is ranked highest in the ranked list, or has a highest bid price. The mediation component 602 may select a display ad (e.g., in some cases, without sending ad requests 618 for video ads), if the mediation component 602 determines that an available network bandwidth for the client device 520 is constrained, for example, below a pre-determined threshold, or with a mobile (e.g., cellular) network connection only. The mediation component 602 may also retrieve an audio portion only of a selected video creative, for example, if available bandwidth for downloading the video is constrained. In some implementations, the mediation component 602 can determine an available network bandwidth by measuring a download speed for retrieving video creatives from the ad servers 650, or additional VAST files. The mediation component 602 can also retrieve a different resolution version (e.g., different file size) of a video creative based on the determined bandwidth.

The mediation component 602 can direct the video accelerator 250a (e.g., the video caching module 206) to store (cache) the selected video creative and/or information associated with the selected ad response (e.g., VAST tag) in a local storage, for example. For instance, the video caching module 206 can store the selected video creative in one or more HTML5 local storage objects. In this way, the selected video creative can be readily available for presentation when the user 519 navigates to a location near the ad space 526 in the user interface 524 or attempts to view desired media content in a video player. The selected video can be stored in an HTML5 local storage object that does not expire, or in an HTML5 local storage object that is specific to a user session (e.g., a web browser tab) and is lost after the user session is closed. The video caching module 206 can also specify a time-to-live (e.g., 4 hours) for the local storage, and remove the cached video from the local storage after the time-to-live had expired. Other methods for storing the selected video in a local storage are possible. For instance, the video caching module 206 can store the selected video in a web browser cookie, or in a memory associated with a computing process of the video accelerator 250a ("in-memory"). The video accelerator 250a can specify a preferred list of local storages, for example, HTML5 local storage object, cookie, and in-memory. Fallback logic can be used to determine which methodology to instantiate based on a user's local environment. Note that videos can be cached as full video files (e.g., VPAID, mp4, or swf) or only as VAST tags, to reduce storage needs.

In addition, the video caching module 206 can instantiate one or more "local storage" objects for caching videos associated with the user interface 524 (or can cache videos within "session storage" associated with user sessions). For instance, each local storage object can be used for a video creative for a different advertising target (e.g., different user segments).

It should be noted that, in some implementations, certain functionality performed by the mediation component 602 as described herein can be performed by server system 522 or some other server-side component. For example, rather than executing an impression auction client-side, an ad auction platform in server system 522 can be responsible for sending the ad requests to the ad servers 650 and receiving the bid responses, if any. In other words, the ad auction techniques described above can be shifted to programmatic RTB platforms that are remote to the client device 520 but have substantially greater processing power and are optimized for such operations. In addition, such remote components (e.g., server system 522) can perform compositing or stitching of advertising content and other video content (e.g., a video clip, television program, movie, etc.), thereby delivering a single, seamless video stream to the user. For example, the video stitching module 210 of the video accelerator 250 may be implemented in the server-side video accelerator 250b rather than the client-side video accelerator 250a. The stitching approach is, in some instances, effective against ad blockers because the video stream is integrated and blocking the advertising content would result in blocking the other media content as well.

The user interface 524 can retrieve from the local storage and present (e.g., by a video player of the user interface 524) the selected video creative (step 626) in response to a user event associated with the user interface 524. For example, the user interface 524 can start presenting the selected video in the ad space 526. A user event can be a user navigating to a location near the ad space 526, a cursor hovering over the ad space 526, or a user selection of a play button or other online content. The user interface 524 can stop presenting the video creative when the user navigates away from the video creative, or when the user selects a stop or pause button, for example. Other user events for triggering the presentation and/or stoppage of the selected video are possible. For instance, the user interface 525, such as a web browser, can start presenting the selected video (e.g., in outstream video format) in a web page when a user scrolls down the web page and the selected video window appears (e.g., when at least 50% of the area or window of the selected video is in a view port of the web browser). In some implementations, the web browser turns on an audio portion of the selected video when a curser hovers over the selected video ad. The web browser can pause the selected video when the user scrolls further down (or back up) the web page and moves away from the selected video ad. The web browser can resume presenting the selected video when the user navigates back to the selected video. After a selected video ad is presented, the web browser can present a display ad (e.g., from the ranked list of ads) in place of the selected video ad.

After the selected video has been presented (e.g., completely, or partially but exceeding a pre-determined time period), the mediation component 602 can send a report (step 628) to the server system 522 for storing in the transaction data database 534. For instance, the report can include the winning bid price, a buyer of the winning bid, error message, a latency for retrieving the selected video creative from an ad server. Other reporting information for storing in the transaction data database 534 is possible. The mediation component 602 can instruct the video caching module 206 to remove the selected video from the local storage after the selected video has been presented.

After responses have been received (step 620), a video creative has been selected and stored in a local storage (step 624), or the selected video creative has been presented (step 626) or reported (step 628), the mediation component 602 can send a second set of ad requests (step 632) to the ad servers 650 specified in the ranked list. When receiving a second set of responses (step 634) from the ad servers 650, the mediation component 602 processes the second set of responses (step 636) for presentation of a video ad in the ad space 526, and selects and caches a second particular video creative (step 638), as described earlier in reference to steps 618, 620, 622, and 624. The second selected video creative can be cached in a local storage that is different from the local storage used for the first selected video creative. The user interface 524 can present the selected video creative (step 640) in the ad space 526 in response to a user event. More particularly, when receiving and processing the second set of responses, the mediation component 602 can have a longer time-out period for allowing the ad servers 650 to provide responses, thus providing a potentially larger pool of responses and higher bid price. The longer time-out period can be pre-determined (e.g., 600 milliseconds). The longer time-out period can also be determined based on the length of the first selected video creative. For instance, if the first selected video creative has a length of 10 seconds, the mediation component 602 can have a time-out period of 5 seconds for the second set of responses, since it is unlikely a second video creative is needed when the first selected video creative is being presented. In some implementations, the mediation components 602 can send the first set of ad requests (step 618) and the second set of ad requests (step 632) simultaneously to the ad servers 650.

As describer earlier, the mediation component 602 can be, include, or use an ad tag of an ad space. In some implementations, an ad tag can be a universal tag that supports multiple ad spaces (for ad placements) in a web page. Each ad space supports one or more ad media types. Ad media types can be a display ad, a video ad, an audio ad, and a native ad. Other ad media types are possible. For instance, an ad space can support video ads in the outstream video format. The universal tag can, in response to a user event, send ad requests for one or more of the ad spaces in the web page to the server system 522 in a single transmission (or a minimal number of transmissions). The server system 522 can conduct multiple real-time auctions (or identify existing agreements between buyers and sellers) for all requests, and provide resulting creatives (or ad servers for resulting creatives) in a single response (or in a minimal number of transmissions) to the user interface 524. The response can also include media renderers (or identifiers of renderers) for the resulting creatives.

Each ad space can include one or more targeting attributes (e.g., user demographics) and technical attributes (e.g., video skip offset, video skippability enabled, auto detection of page text width to define video layer size, and so on). The universal tag can send to the server system 522 ad request for the ad spaces in the web page, including the targeting and technical attributes. The server system 522 can conduct auctions (or identify existing agreements) for the requests based on the targeting and technical attributes.

The universal tag can support the outstream video format for ad spaces. A video ad in the outstream video format can expand from a zero initial state to full size, can pause when out of view by a configurable threshold, and/or can resume playback when in view by a configurable threshold. The outstream video format can also support audio and video behaviors (technical attributes) such as auto-play vs. mouseover to activate sound and/or video, for example. Other audio and video behaviors supported by the outstream video format are possible.

The server system 522 can conduct auctions (or identify existing agreements) for video ads in the outstream video format as requested by the universal tag, and return resulting video ad information (e.g., in VAST tags), an outstream video renderer, and/or technical attributes for the video ad to the user interface 524.

In addition to sending ad requests to the server system 522, the universal tag or the mediation component 602 can send ad requests to the ad servers 650 for each of the ad spaces in the web page and each of the media types supported by the ad spaces. The mediation component 602 can select the best available responses from the ad servers 650, as described earlier in reference to steps 618, 620, 622, and 624. In this way, additional pools of buyers may be available (in addition to the auctions conducted by the server system 522) and can yield better revenue for the ad spaces.

In some implementations, if there is no demand for one of the media types for an ad space supported by the universal media tag, an alternative media type may be used instead. This can allow for maximizing revenue opportunity within a single ad space for the content. There could be many different media types competing for the opportunity to fill the ad space, in comparison to competing demand sources for the same media type.

Pre-Bidding for Online Advertising

Historically, publishers have allocated portions of their ad space inventory to buyers (e.g., advertisers or ad networks) for the buyers' ad campaigns ("direct" ad campaigns or "programmatic" ad campaigns) through offline agreements. For example, a publisher can allocate 20% of the ad space inventory on the landing page of a website or a mobile app during a specified week or month to one advertiser for an ad campaign, allocate 15% of the ad space inventory on the landing page during the same week or month to another advertiser for another ad campaign, and allocate another 15% of the ad space inventory on the landing page during the same week or month to an ad network for the ad campaigns of the ad network's clients. The terms of such agreements can include the payment model and pricing for the ad space inventory, the desired pacing of the ad campaign (e.g., the time rate at which the publisher's ad spaces are allocated to the ad campaign), targeting parameters (e.g., preferences or limits on which instances of ad space inventory can be allocated to an ad campaign, based on data associated with the ad space inventory), priority of the ad campaign relative to cotemporaneous ad campaigns on the publisher's site, etc.

Such agreements are generally implemented and enforced by an allocation manager associated with (e.g., executing on) the publisher's ad server. To implement and enforce the terms of such agreements, the allocation manager generally uses "line items" and prioritization rules. When a request to fill an available ad space is received, the allocation manager compares the characteristics of the ad space to the parameters of line items representing the publisher's agreements with buyers. If more than one line item matches the ad request (indicating that more than one creative or ad campaign may be eligible to fill the ad space), the allocation manager applies the prioritization rules to determine which ad campaign or creative fills the ad space.

Thus, line items have historically been used to allocate a seller's ad space inventory among buyers in ways that are consistent with the terms of agreements between the seller and the buyers, including terms relating to targeting, pacing, prioritization, number of impressions, and budget constraints. Since line items have historically implemented terms of agreements reached in advance of starting an ad campaign, the values of parameters of conventional line items (e.g., the values of price and prioritization parameters) have been set by programmers prior to initiating the ad campaign, and have remained constant throughout the ad campaign.

Historically, some publishers have made some ad space inventory available to real-time bidders via auctions. For example, if a publisher's allocation manager determines that no line items match an ad request, the allocation manager can forward the request to an ad exchange, which can offer the ad space to bidders in an auction. The ad space is then allocated to the winning bidder, and the system serves a creative provided by the winning bidder to fill the ad space.

In recent years, some buyers and sellers of ad space inventory have become dissatisfied with the conventional practice of allocating some ad space inventory based on offline agreements before making the remaining inventory available to real-time bidders. This conventional practice can result in publishers allocating very valuable ad spaces to ad campaigns at below-market prices, which depresses the publishers' revenue and limits real-time bidders' access to valuable ad space inventory.

To address these concerns, some publishers have implemented pre-partner auctions, which can take place prior to allocating ad space inventory to the ad campaigns of the publishers' direct or programmatic partners. Such pre-partner auctions are sometimes referred to as "pre-bidding," "header bidding," "advance bidding," "header tags," or "tagless bidding." When an instance of an ad space is available to fill (e.g., when a browser begins to load a web page with an ad space), a system can initiate a pre-partner auction by requesting bids from pre-bidding partners. Auction data describing the results of the pre-partner auction (e.g., the identity, bid price, and creative of the winning bidder, or the identities, bid prices, and creatives of multiple bidders) are then provided to the allocation manager, which uses the auction data to determine how to allocate the ad space.

For example, the allocation manager can use the winning bid price as an estimate of the value of the ad space. Rather than simply allocating the ad space to the ad campaign corresponding to the highest-priority line item that matches the ad request, the allocation manager can determine whether the prices corresponding to the matching line items are greater than or less than the estimated value of the ad space. If the prices corresponding to the matching line items are less than the estimated value of the ad space, the allocation manager can, in some cases, allocate the ad space to the winner of the pre-partner auction, or solicit bids from real-time bidders through a post-partner auction, which can take place after allocating ad space inventory to the ad campaigns of the publishers' direct or programmatic partners. In this way, pre-bidding can limit the extent to which the publisher's direct and programmatic partners are able to purchase valuable ad inventory at below-market prices, and allow real-time bidders to compete for more valuable ad inventory. Nevertheless, the allocation manager is generally configured to allocate sufficient ad inventory to direct and programmatic partners to satisfy the terms of their agreements, even in cases where doing so allows such partners to purchase valuable ad spaces at below-market prices.

Systems that implement pre-bidding generally use conventional line items to integrate the results of the pre-partner auction into the allocation manager's process for allocating ad space inventory. In particular, programmers can create a collection of line items for each potential participant in the system's pre-partner auctions. The collection of line items for a pre-bidding partner generally includes one line item for each price or "price bucket" (e.g., a value representing a corresponding range of prices) that the pre-bidding partner can bid for an ad space. When a bid for an ad space is received from a pre-bid partner, the allocation manager searches for a line item with a "buyer identity" parameter that matches the identity of the pre-bid partner and a "price" (or "price bucket") parameter that matches the value of the partner's bid. In this way, the dynamically variable value of each pre-bid partner's bid is matched to a line item with a static price or price bucket parameter having the same value. The allocation manager then determines whether to allocate the ad space to an ad campaign, allocate the ad space to a pre-bidder, or initiate a post-partner auction. This determination can be made by applying the allocation manager's prioritization rules to the pre-bid line items that match the pre-bid(s) and the ad campaign line items that match the ad request. (Other techniques for implementing pre-bidding are described in U.S. patent application Ser. No. 14/838,758, titled "Systems and Techniques for Allocating Ad Space Inventory" and filed on Aug. 28, 2015 under which is incorporated herein by reference to maximum extent permitted by applicable law.)

Prefetching Pre-Bid Data for Online Advertising

Conventional techniques for implementing pre-bidding for online advertising can result in long latencies in the loading and displaying of network-based content on client devices. In conventional implementations of pre-bidding, when the client device begins to display content that includes an ad space (e.g., in response to a user accessing the content), the client device transmits a request for a pre-bid to an ad exchange and waits for the ad exchange to reply. The ad exchange then conducts a real-time auction and transmits the pre-bid data of the winning pre-bidder to the client device. The pre-bid data may include a pre-bid price and an ad tag corresponding to a creative to be displayed if the ad space is allocated to the pre-bidder. The client device then transmits an ad space allocation request to an ad server and waits for the ad server to respond. The ad space allocation request identifies the ad space and includes the pre-bid data. The ad server then determines whether to allocate the ad space to the pre-bidder, a programmatic or direct partner, or another real-time bidder, and transmits ad allocation data to the client device. The ad allocation data includes an ad tag corresponding to the creative to which the ad space has been allocated. The client device then executes the ad tag to download and display the creative in the ad space, and also displays the content accessed by the user. The process of communicating with the ad exchange, communication with the ad server, and obtaining the creative to be displayed in the ad space can be quite time-consuming, and can result in significant latency between the time when a user initiates access to content and the time when the client device provides (e.g., displays) the content to the user.

The inventors have recognized and appreciated that some of the problems associated with conventional implementations of pre-bidding can be alleviated or eliminated by prefetching pre-bid data. Prefetching pre-bid data may involve requesting pre-bid data for an ad space in advance (e.g., before the user accesses the content that includes the ad space and/or before the client device begins to display the ad space). In this way, the client device may obtain pre-bid data in advance, including a pre-bid price and an ad tag corresponding to the creative to be displayed if the ad space is allocated to the pre-bidder. Then, when the user accesses the content that includes the ad space and/or when the client device begins to display the ad space, the client device may use the prefetched pre-bid data, rather than communicating with an ad exchange to obtain the pre-bid data. In some implementations, the client device may also use the ad tag to obtain (e.g., download) the creative for the pre-bid in advance. Then, when the ad server allocates the ad space to the pre-bid, the client device may display the pre-fetched creative, rather than communicating with an ad server to obtain the creative. In this way, pre-fetching pre-bid data can reduce the user-perceptible latency associated with pre-bidding for online advertisements.

Figure 7:
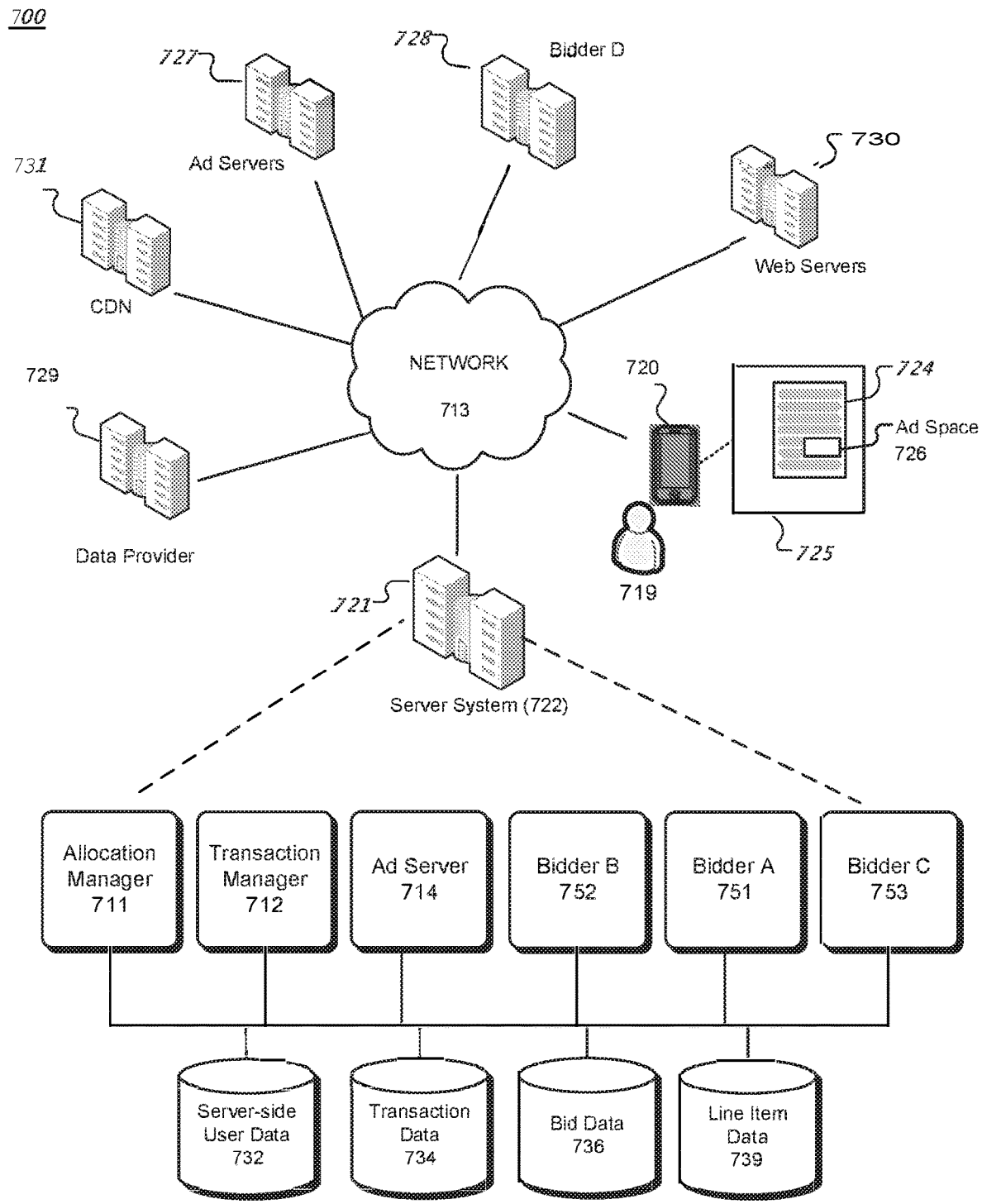
FIG. 7 is a block diagram of a system for online advertising, according to some embodiments.

FIG. 7 illustrates an online advertising system 700, according to some embodiments. In advertising system 700, a server system 722 provides functionality for allocating ad space inventory. In some embodiments, server system 722 also provides functionality for real-time ad space data packaging and auctions. The server system 722 comprises modules (e.g., hardware components, software components, databases, etc.) that can be deployed at one or more data centers 721 in one or more geographic locations, for example. The server system 722 modules comprise an allocation manager 711, a transaction manager 712, ad server 714, and one or more bidders (e.g., bidder A 751, bidder B 752, and bidder C 753). The server system 722 can also include one or more modules for load balancing tools and/or security tools. The load balancing tools manage traffic within a single data center or between multiple data centers. The security tools manage data protection and access privilege for tenants served by the data centers 721. The modules can comprise components that can execute on the same or on different individual data processing apparatus. The server system 722 databases comprise a server-side user data database 732, transaction data database 734, bid data database 736, and line item data database 739. The databases can reside in one or more physical storage systems. The server system modules will be further described below.

By way of illustration, a graphical user interface 724 of a software application 725 executing on client device 720 of a user 719 can include an ad space 726. The application 725 can be an application for a desktop operating system or for a mobile operating system (e.g., a "mobile app"), including, without limitation, a web browsing application, gaming application maps application, streaming media application, content viewing application, etc. Other examples of applications 725 are possible. The application 725 can retrieve content (e.g., text content, image content, video content, etc.) through one or more data communication networks 713 (e.g., the Internet) from, for example, web servers 730 of a content publisher, and can present (e.g., display) the content via a user interface 724 (e.g., a user interface of the software application 725). For instance, a user interface of a mobile app running on a client device 720 (e.g., a user's mobile device) and operable to display content can include an ad space. By way of illustration, the ad space can appear at the bottom of the user interface (e.g., a "banner ad"). Other examples of ad spaces are possible. Here, the client device 720 can be a mobile phone, a smartphone, a smart watch, a tablet computer, a personal computer (e.g., laptop computer, desktop computer, etc.), a game console, or an in-car media system. Other examples of a client device are possible.

In some implementations, the client device 720 can use an ad tag to present (e.g., display) an advertisement (e.g., a creative) in an ad space. In some embodiments, an ad tag comprises an address (e.g., Uniform Resource Locator (URL)) of a device or system from which an ad will be requested (e.g., a URL for the server system 722), statements (e.g., Hypertext Markup Language (HTML) statements) for retrieving and displaying a creative, and/or instructions (e.g., JavaScript instructions) for retrieving and displaying a creative (e.g., displaying the creative in a frame, for example a 160 pixel×600 pixel iframe). Executing the ad tag causes the application 725 to send (e.g., through the networks 713) an ad request to the addressed device or system (e.g., to server system 722). In some implementations, the application 725 sends an ad request to the server system 722 via another advertising server system such as an ad exchange. The ad request can include information about the available ad space 726 (e.g., a size for the ad space, an identifier for the publisher), user information (e.g., an identifier of the user 719, data describing the user 719, an Internet Protocol or IP address of the device 720, etc.), and/or system information (e.g., types of the browser and the client device), for example. The ad request can be composed in JavaScript Object Notation (JSON) or Extensible Markup Language (XML) format and transmitted to the server system 722 using Hypertext Transfer Protocol (HTTP) protocol (e.g., using HTTP POST request method). Other ad request formats and transmission methods are possible.

In some implementations, the client device 720 can use an impression tag to make a record of an impression (e.g., a record of an application displaying an advertisement in an instance of an ad space 726). Such records may be used by publishers and advertisers, for example, to track the progress of ad campaigns, to determine how much compensation the advertiser owes the publisher for displaying the advertiser's ads, etc. In some embodiments, an impression tag comprises an address (e.g., Uniform Resource Locator (URL)) of a device or system that maintains records of impressions provided by the application 725, statements (e.g., HTML statements) for recording the data associated with an impression, and/or instructions (e.g., JavaScript instructions) for recording the data associated with an impression. Executing the impression tag may causes the application 725 to send (e.g., through the networks 713) an impression notification to the addressed device or system (e.g., to server system 722). The impression notification can include information about the impression (e.g., the size of the ad space in which the creative was displayed, data identifying the application and/or the publisher that generated the impression, data indicating how long the user viewed the impression, data indicating whether the user clicked the creative, etc.), user information (e.g., an identifier of the user 719 who viewed the impression, data describing the user 719 who viewed the impression, an Internet Protocol or IP address of the device 720 that generated the impression, etc.), and/or system information (e.g., types of the browser and the client device), for example. The impression notification can be composed in JavaScript Object Notation (JSON) or Extensible Markup Language (XML) format and transmitted to the server system 722 using Hypertext Transfer Protocol (HTTP) protocol (e.g., using HTTP POST request method). Other impression notification formats and transmission methods are possible.

The allocation manager 711 allocates portions of a seller's ad space inventory to buyers. Here, an ad space inventory can include one or more ad spaces in content served by a publisher. Alternatively or in addition, an ad space inventory can include one or more ad spaces in user interfaces presented by a software application published by a publisher. Other collections of ad spaces in an ad space inventory are possible. A buyer can be an advertiser (e.g., a credit card company, a sportswear company), an ad network, an ad exchange, or an advertising agency, for example. Other buyers are possible. A seller can be a publisher (e.g., newspaper or social network), an online streaming or gaming service, an ad exchange, or an ad network. Other sellers are possible.

The allocation manager 711 processes ad requests received from applications 725 (e.g., web browsers or other applications displaying content from publishers) executing on client devices 720, allocates the ad space inventory referenced by the ad requests to buyers (e.g., based on agreements between buyers and the seller of the ad space inventory, based on the results of auctions, etc.), sends relevant information to advertisers, returns creatives to the browsers or other applications, keeps track of billing and usage for advertisers and publishers, and/or enforces quality standards, for example.

A seller can negotiate with a buyer and reach an agreement on pricing or other terms for running an ad campaign on ad space inventory available from the seller. The seller or the buyer can create (e.g., through an API or a web page provided by the server system 722) one or more line items (e.g., implemented as data objects) representing the terms of the agreement and store the line items in the line item data database 739. Such line items can be referred to as "ad campaign line items."

Alternatively or in addition, a prospective buyer can use pre-bidding techniques to place bids on an instance of ad space (e.g., during a pre-partner auction that takes place before the application 725 executing on the client device 720 sends the ad request to the server system 722). The seller or bidders can create (e.g., through an API or a web page provided by the server system 722) one or more line items (e.g., implemented as data objects) representing the bidders' pre-bids. Such line items can be referred to as "pre-bid line items."

A line item's parameters can include, without limitation, an identifier of a seller, an identifier of a buyer, identifiers of one or more ad spaces from the seller's ad space inventory, ad tags of one or more creatives from the buyer's ad campaign, and/or a price for filling an instance of an ad space with a creative from the buyer's ad campaign. For ad campaign line items, the value of the price parameter can be a static price based on the terms of the agreement between the buyer and seller. For pre-bid line items, the value of the price parameter can be static or dynamic, and can be determined based on the buyer's pre-bid. A line item can also include flight dates (start and ending dates for the ad campaign) and one or more user target segments.

The allocation manager 711 can use the line items to allocate the ad space inventory among ad campaigns and pre-bidders. When the allocation manager 711 receives a request to fill an instance of an ad space, the allocation manager compares data associated with the instance of the ad space to the parameters of the line items in the line item data database 739. If no line items match the ad request, the allocation manager 711 can send a request to transaction manager 712 to conduct a post-partner auction for the ad space. If more than one line item matches the ad request, the allocation manager 711 determines how to allocate the ad space (e.g., based on one or more line item prioritization rules). Identifying multiple matching line items for an ad request can indicate, for example, that more than one ad campaign is eligible to fill the ad space, or that multiple bidders placed pre-bids for the ad space, or that at least one ad campaign is eligible to fill the ad space and at least one bidder placed a pre-bid for the ad space.

Data associated with the application 725 containing the ad space 726 can provide targeting information for buyers of the ad space 726, and the ad space can potentially command higher bid prices from bidders because of the targeting information. For instance, the theme(s) of the application 725, topic(s) or genre(s) of the content generally presented via the user interface of the application 725, and/or target demographic(s) of the application 725 may be used to provide targeting information.

Data associated with the application 725 can include data associated with the user 719 (e.g., user segment data and/or user behavioral data). User segment data include demographic information, for example, age, gender, location, school, and occupation, or any other information that describes a segment of a population with which the user may be associated. Other user segment data are possible. User behavioral data can include data associated with a user's use of the client device 720, including, without limitation, frequency of use of the client device, frequency of use of the application 725, search history within the application, online activities through other applications (e.g., a web browsing app), etc. Other user behavioral data are possible. The value of an ad space to different advertisers may depend on the user segment data and/or user behavioral data. For instance, a grocery store advertiser may be willing to bid more on an ad space 726 if the user data indicates that the user is interested in food related topics (e.g., the user 719 has registered with a food website).

Data associated with the app 725 can include contextual data. For instance, contextual data can include the type of the user interface 724, structure of the user interface 724 (e.g., a number of ads on the user interface 724), subject matter of the application or user interface (e.g., theme(s), topic(s), or genre(s) of the application or the content generally presented via the user interface 724 of the application), an identifier of the ad space, the dimensions of the ad space, and/or timing data (e.g., the current month, day of the week, date, and/or time). Other contextual data are possible. The value of an ad space to different advertisers may depend on the contextual data. For instance, a sporting goods advertiser may be more likely to bid more on the ad space 726 if the contextual data indicates that ad space 726 is part of an application with a sports-related theme.

User segment data (e.g., demographic information) can be provided by a user to a publisher when the user accesses content or applications published by the publisher. Some user segment data (e.g., location) can be determined by data associated with the user's client device (e.g., client device 720), for example, an Internet Protocol (IP) address associated with the client device. User behavioral data can be collected by an application (e.g., application 725) executed on a user's client device (e.g., client device 720). Contextual data can be determined by analyzing content (e.g., words, semantics) presented in the user interface, transmitted to the server system 722 with the ad request, or obtained using any other suitable technique.

A buyer (or a seller) can acquire data associated with an ad space from the ad space's publisher or from a data provider (e.g., Proximic of Palo Alto, Calif.). In various implementations, the buyer (or the seller) can store user data in the server-side user data database 732. For instance, the buyer can store in the server-side user data database 732 mappings between user identifiers and user segments.

In some embodiments, the allocation manager 711 implements allocation policies designed to enhance the seller's revenue while also adhering to the terms of the seller's ad campaign agreements. For example, when an ad campaign line item and a pre-bid line item match an ad request, and the pre-bid line item's price for the ad space exceeds the ad campaign line item's price, the allocation manager 711 can allocate the ad space to the pre-bidder, rather than the ad campaign partner. On the other hand, if allocating the ad space to the pre-bidder would jeopardize the system's ability to meet the terms of its agreement with the ad campaign partner, the allocation manager 711 can allocate the ad space to the ad campaign partner, even though the ad campaign line item's price is lower than the pre-bid line item's price.

More generally, the allocation manager 711 can select one of the matching line items to fill the ad space based on any suitable information, including, without limitation, one or more prioritization rules, the line items' parameters (e.g., the price parameters), the terms of ad campaign agreements (e.g., the number of ad spaces to be allocated to the ad campaign, the target pace of the ad campaign, etc.), and the status of current ad campaigns (e.g., the number of ad spaces that have been filled with ads from the ad campaign, the current pace of the ad campaign, etc.). In some embodiments, line items include priority parameters. The value of a priority parameter may represent a priority rank or a priority tier of the line item. The allocation manager 711 can select a line item to fill an ad space based, at least in part, on the priority parameters of the matching line items.

In some embodiments, the allocation manager 711 determines the parameters of a pre-bid based on a URL associated with an ad request (e.g., the URL of the ad tag used to initiate the ad request). To fill an ad space, a client device 720 can conduct a pre-partner auction before sending the ad request to the allocation manager 711. During the pre-partner auction, the client device 720 can receive one or more pre-bids for the ad space from one or more pre-bidding partners. The client device 720 can send the pre-bids to the allocation manager 711 by adding data indicative of the pre-bids to a URL (e.g., a URL that the software application 725 calls to send an ad request to server system 722). For example, for each pre-bid, the client device 720 can add data identifying the pre-bidder (a "pre-bidder identifier") and data indicating the price of the pre-bid (a "pre-bid value") to the query string of the URL. In some embodiments, the pre-bidder identifier and pre-bid value for each pre-bid are encoded as key-value pairs in the URL's query string. After the software application 725 calls the URL to send the ad request to the server system 722, the allocation manager 711 can parse the URL's query string to determine the pre-bidder identifier and the pre-bid value for each pre-bid.

Optionally, the allocation manager can also receive ad tags from client device 720 for the pre-bids. Each pre-bid's ad tag (e.g., a URL from which the bidder's creative can be retrieved) can be added to the query string along with the corresponding pre-bidder identifier and the pre-bid value. A pre-bid's ad tag can be used to serve the corresponding creative if the ad space is allocated to the pre-bid.

For some ad requests, the server system 722 can allocate the ad space to a buyer without conducting a post-partner auction. In cases where no line item matches the ad request, or in cases where one or more line items match the ad request but the allocation manager decides to conduct a post-partner auction before allocating the ad space, the allocation manager 711 can send an auction request to the transaction manager 712 to initiate a post-partner auction for the ad space.

The transaction manager 712 ("impression bus" or simply "Imp Bus") implements an auction system that facilitates transactional aspects of ad space inventory and impression trading between buyers and sellers. The transaction manager 712 can process requests to auction ad spaces ("auction requests"). Auction requests can be received, for example, from the allocation manager 711 (e.g., for post-partner auctions) or from the client device 720 (e.g., for pre-partner auctions). The transaction manager 712 can conduct auctions (e.g., on behalf of sellers), return creatives or ad tags to the auction requester (e.g., allocation manager 711 or the software application 725 executing on the client device 720), and/or return auction-result data, for example. The transaction manager 712 can stores in the transaction data database 734 various transaction information for ad spaces that are transacted by the transaction manager 712 or other modules of the server system 722.

A bidder system or bidder (e.g., bidder A 751) performs bidding operations on behalf of a buyer. The bidder takes various pieces of bid-specific information (e.g., maximal bid price, target user areas or segments, start and end dates, budget) as input and generates a bid for a particular instance of an ad space inventory, for example. A buyer can set up (e.g., through an API or web pages provided by the server system 722) a campaign targeting an ad space inventory with a set of bid-specific information for the ad space inventory and store the bid-specific information in bid data database 736. In some implementations, a bidder can be remote from the server system 722, such as bidder D 728.

The transaction manager 712 conducts an auction when an auction request for filling an available ad space is received (e.g., from the allocation manager 711). In response to receiving the auction request, the transaction manager 712 generates a bid request including information about the ad space, the user, and so on, and sends the bid request to multiple bidders such as bidder A 751 and bidder B 752. The transaction manager 712 can also send the bid request through the networks 713 to servers of bidder D 728, which is external to the server system 722. The bid request can be composed in JSON format and sent to bidders using HTTP POST. The bid request can also be encoded or compressed. Other bid request formats and transmission methods are possible. The winning bid price can be the highest bid price, or a second highest bid price of the auction as determined by Vickrey auction or other second-price auction mechanisms.

Each bidder can determine an appropriate bid based on its own requirements (e.g., budget, targets in placements) and submit a bid response including a bid price and an identifier of a creative to be served, for example, to the transaction manager 712 (or not to respond at all). The transaction manager 712 determines a winning bid (e.g., a highest bid) among bid responses received within a specified time period (e.g., 100 milliseconds). The transaction manager 712 then returns a creative associated with the winning bid or a URL for a creative associated with the winning bid to the allocation manager 711.

After the allocation manager 711 has allocated the ad space (e.g., to a pre-bidder corresponding to a pre-bid line item that matches the ad request, to an ad campaign corresponding to an ad campaign line item that matches the ad request, or to the winner of the post-partner auction for the ad space), the allocation manager 711 can send a creative associated with the selected line item or winning bidder to the client device 720, causing the application 725 to display the creative in the ad space in the user interface 724. In some embodiments, the allocation manager 711 sends the client device 720 a URL for a creative associated with the selected line item or winning bidder, causing the application 725 on the client device 720 to retrieve the creative from an ad server (e.g., ad server 714, or ad servers 727 external to the server system 722), or from servers of a content distribution network (CDN) 731. For ad campaign line items, the creatives or URLs of the creatives associated with the line items can be provided by the buyer when the line items are created (e.g., through an API or a web page provided by the server system 722). For pre-bid line items, the creatives or URLs of the creatives associated with the line items can be provided by the pre-bidders along with their pre-bids, and can be transmitted to the allocation manager 711 with the pre-bids. For example, the URL of a creative can be inserted in the ad tag query string.

The ad server 714 can serve creatives to web browsers or other applications. The ad server 714 can also make decisions about which creatives to serve, and track clicks or other user interactions with creatives, for example. A creative can be a visual or audio advertisement such as an image, an animation, a video clip, or an audio clip. Other types of a creative are possible.

In various implementations, the allocation manager 711 can store in the transaction data database 734 transaction information such as an identifier of the creative served to the ad space, an identifier of the buyer, the user's identifier, the price of the ad space, an identifier of the ad space, an identifier of the seller of the ad space, and/or a time stamp. Other transaction information of a transaction is possible.

Some embodiments have been described in which an allocation manager 711 is used in connection with a transaction manager 712, which conducts real-time auctions. In some embodiments, allocation manager 711 is used without transaction manager 712 (e.g., in connection with an ad server, ad network, or ad exchange that does not conduct real-time auctions). In some embodiments, allocation manager 711 is included in ad server 727.

Figure 8:
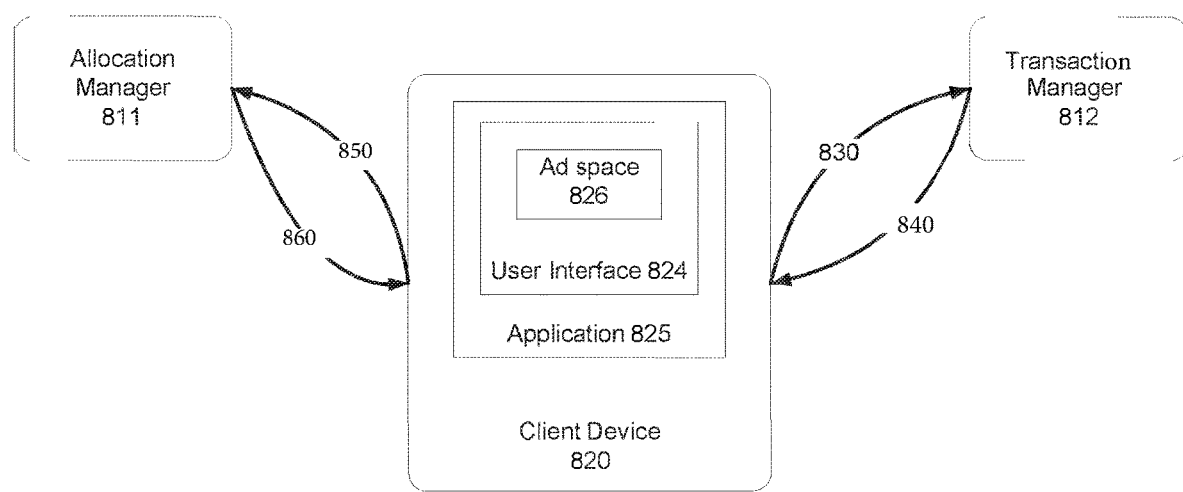
FIG. 8 is a block diagram of a system for prefetching pre-bid data for online advertising, according to some embodiments.

FIG. 8 is a block diagram of an online advertising system that prefetches pre-bidding data, according to some embodiments. The client device 820 (e.g., client device 720) may execute an application 825 (e.g., application 725), which may include a user interface 824 (e.g., user interface 724). The user interface 824 or the content displayed by the user interface may include one or more ad spaces 826. The client device 820 or an application executing thereon (e.g., application 825) may determine whether to prefetch pre-bid data for an instance of an ad space 826 prior to the ad space being displayed by the user interface 824. This determination may be based on any suitable criteria, as described in further detail below.

When the client device determines to prefetch pre-bid data for an instance of the ad space 826, the client device may prefetch the pre-bid data from a remote transaction manager 812 (e.g., transaction manager 812). To prefetch the pre-bid data, the client device may transmit 830 a request for pre-bid data to the transaction manager 812. The request for pre-bid data may include data associated with the application, including, without limitation, contextual data and/or user data. The transaction manager 812 may use the data associated with the application in connection with any suitable pre-bidding technique (e.g., conducting a real-time pre-partner auction) to generate the pre-bid data, and may transmit 840 the generated pre-bid data to the client device 820.

The pre-bid data may include data corresponding to one or more pre-bids. In some embodiments, the data corresponding to a pre-bid includes a pre-bidder identifier (e.g., data identifying the party that offered the pre-bid), a pre-bid price (e.g., the value offered by the pre-bidder for an instance of the ad space 826), and/or an ad tag (e.g., an ad tag for a creative to be displayed in the ad space 826 if the ad space is allocated to the pre-bid). In some embodiments, the client device 820 uses the ad tag to obtain (e.g., download) the creative before the allocation manager 811 allocates the instance of the ad space.

When the client device 820 determines that an instance of the advertising space 826 is available to fill (e.g., in response to the user accessing a portion of the user interface 824 that contains the ad space 826), the client device transmits 850 an ad space allocation request to the allocation manager 811 (e.g., allocation manager 711). The ad space allocation request may include data associated with the application, including, without limitation, contextual data, user data, and/or at least a subset of the pre-bid data. The allocation manager 711 may use the data provided with the ad space allocation request in connection with any suitable ad space allocation process to allocate the instance of the ad space 826 (e.g., to a partner, pre-bidder, or post-partner bidder), and may transmit 860 allocation data to the client device 820.

The allocation data may include data corresponding to the advertisement and/or advertiser to which the instance of the ad space 826 is allocated. In some embodiments, the allocation data includes an advertiser identifier (e.g., data identifying the party to which the instance of the ad space was allocated), an ad tag (e.g., an ad tag for a creative to which the ad space 826 was allocated), and/or an impression tag (e.g., an impression tag for notifying a remote device that the creative was displayed by the application 825). In cases where the client device 820 has not already pre-fetched the creative to which the ad space was allocated, the client device 820 may use the ad tag to obtain (e.g., download) the creative. The client device 820 may display the creative to which the ad space was allocated, and execute the corresponding impression tag.

Figure 9:
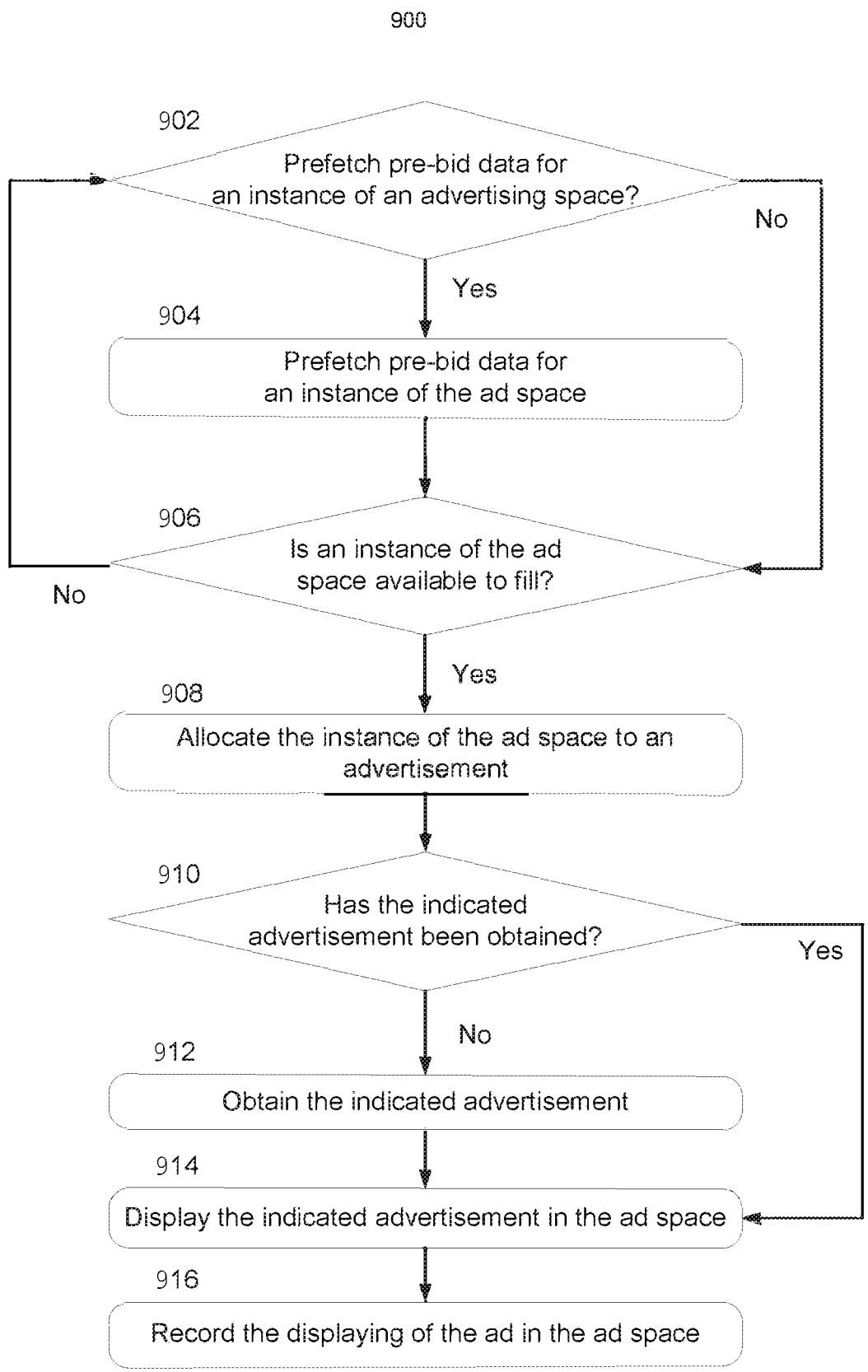
FIG. 9 is a flowchart of a method for prefetching pre-bid data for online advertising, according to some embodiments.

FIG. 9 illustrates a method 900 of prefetching pre-bid data, according to some embodiments. In some embodiments, the method 900 of prefetching pre-bid data includes a step 902 of determining whether to prefetch pre-bid data for an instance of an advertising space, a step 904 of prefetching the pre-bid data for an instance of the ad space, a step 906 of determining whether an instance of the ad space is available to fill, a step 908 of allocating the instance of the ad space to an advertisement, and a step 914 of displaying the indicated advertisement in the instance of the ad space. In some embodiments, the method 900 further includes a step 910 of determining whether the indicated advertisement has been obtained, and if it has not, a step 912 of obtaining the indicated advertisement. In some embodiments, the method 900 further includes a step 916 of recording that the advertisement was displayed in the ad space. Some embodiments of the steps of method 900 are described in further detail below.

Initially, the client device determines (902) whether to prefetch pre-bid data for an instance of an advertising space. The instance of the ad space may correspond, for example, to a region of a user interface or to a portion of content that can be accessed via the user interface. At the time the determination (902) is made, the client device may not be displaying the instance of the ad space, and/or the user may not have accessed the region of the user interface (or the portion of content) that includes the ad space. In some embodiments, the client device may make the determination to prefetch pre-bid data for an instance of an ad space in response to the launching of the application that includes the ad space. Thus, the pre-bid data for an application's ad space(s) may be prefetched when the application launches.

In some embodiments, the device may make the determination to prefetch pre-bid data for an instance of an ad space based on a determination that existing pre-bid data for the ad space (e.g., previously prefetched pre-bid data) is stale. The device may determine that pre-bid data are stale based on any suitable criteria. For example, the device may determine that pre-bid data are stale if the period of time that has elapsed since the pre-bid data were fetched exceeds a predetermined time period.

In some embodiments, the client device may make the determination to prefetch new pre-bid data for an ad space based on the ad space being allocated to a prior pre-bid, or based on an advertisement corresponding to a prior pre-bid being displayed in the ad space. In this way, the client device may determine to prefetch new pre-bid data for an ad space when previously prefetched pre-bid data for the ad space have been used.

In some embodiments, the client device may make the determination to prefetch new pre-bid data for an ad space based on an instance of the ad space being allocated to an advertisement (e.g., based on the client device transmitting an ad space allocation request to an allocation manager, or based on the client device receiving ad space allocation data from the allocation manager). In some embodiments, the client device may make the determination to prefetch new pre-bid data for an ad space based on the client device transmitting, to the allocation manager, an ad space allocation request that includes previously prefetched pre-bid data.

In some embodiments, the client device may make the determination to prefetch new pre-bid data for an ad space based on a prediction relating to the ad space. For example, the application that includes the ad space may provide data indicating the order in which the ad spaces are generally displayed, which ad space is most likely to be displayed next, which ad spaces are most likely to be displayed within a specified period of time, etc. Based on such data, the client device may determine to prefetch pre-bid data for an ad space if the likelihood that the ad space will be displayed within a specified period of time exceeds a threshold likelihood.

If the determination (902) to prefetch the pre-bid data is made, the client device may prefetch (904) the pre-bid data for an instance of the ad space. At least a portion of the pre-bid data may be prefetched from a remote transaction manager. To prefetch pre-bid data, the client device may send a message to the transaction manager, requesting a pre-bid for an instance of the advertising space. The pre-bid request message may include data associated with the application, including, without limitation, contextual data and/or user data. The client device may then receive, from the transaction manager, pre-bid data for an instance of the advertising space. The pre-bid data obtained from the transaction manager may include, for example, a pre-bid price and an ad tag corresponding to an advertisement (e.g., creative) to be displayed if the ad space is allocated to the pre-bid. In some embodiments, the pre-bid data retrieved may include an impression tag (e.g., for notifying a remote device that the creative was displayed by the application).

In some embodiments, prefetching the pre-bid data includes obtaining the advertisement (e.g., creative) to be displayed if the ad space is allocated to the pre-bid. The advertisement may be obtained, for example, by executing the prefetched ad tag.

Returning to FIG. 9, at step 906 of the method 900, the client device determines (906) whether an instance of the ad space is available to fill. The client device may make this determination based on the user accessing the region of the user interface or the portion of content that contains the ad space. For example, the client device may receive user input (e.g., the user may click a link, scroll, swipe, provide other gesture-based input, etc.) instructing the application to display the region of the user interface or the portion of content corresponding to the ad space.

If the determination (906) that an instance of the ad space is available to fill is made, the client device allocates (908) the instance of the ad space to an advertisement. Allocating the instance of ad space may include the client device sending at least a portion of the pre-bid data to an allocation manager, and receiving, from the allocation manager, allocation data indicative of an advertisement (e.g., creative) to be displayed in the instance of the advertising space. The allocation data may include an advertiser identifier, an ad tag for the advertisement to which the instance of the ad space is allocated, an impression tag for recording the impression generated when the advertisement is displayed, etc.

Returning to FIG. 9, at step 910 of the method 900, the client device determines (910) whether the indicated advertisement (e.g., creative) has already been obtained. The indicated advertisement may have already been obtained, for example, if the ad space were allocated to a prefetched pre-bid, and the advertisement corresponding to the pre-bid had been prefetched. Thus, in some embodiments, the client device may determine whether the indicated advertisement has already been obtained by determining whether the advertisement was prefetched. More generally, the client device may maintain a cache of advertisements, which may be indexed, for example, by the ad tags used to obtain the advertisements. To determine whether the indicated advertisement has already been obtained, the client device may check the cache for an advertisement corresponding to the ad tag to which the instance of the ad space has been allocated.

If the client device determines that the ad space has not already been obtained, the client device obtains (912) the indicated advertisement (e.g., creative). In some embodiments, the client device obtains the advertisement by executing the ad tag included in the allocation data.

In step 914 of the method 900, the client device displays (914) the indicated advertisement (e.g., creative) in the instance of the ad space, and in step 916, the client device records (916) the displaying of the advertisement in the ad space. In some embodiments, making a record of the impression involves notifying the transaction manager that the advertisement was displayed, for example, by executing the impression tag corresponding to the displayed advertisement.

The method 900 may be used to prefetch pre-bid data for one or more ad spaces in an application. As described above, prefetching pre-bid data can reduce the latency of online advertising. Embodiments that limit the number of ad spaces for which pre-bid data are prefetched may further reduce the latency of online advertising, relative to embodiments that prefetch pre-bid data for a larger number of ad spaces. One of ordinary skill in the art will appreciate that some prefetched pre-bid data may not be used (e.g., because the application does not display the ad space to which the pre-bid data pertain, or because the pre-bid data become stale before the application displays the ad space). In such cases, the communication bandwidth, processing resources, and storage resources used by the client device to prefetch such pre-bid data are ultimately wasted. Thus, if an application includes a large number of ad spaces and the client device attempts to prefetch pre-bid data for all or a large number of the ad spaces, the waste associated with unused, prefetched pre-bid data may negate the latency reduction associated with the prefetched pre-bid data that are successfully used to reduce latency. In some embodiments, the limit N on the number of ad spaces for which pre-bid data are prefetched may be between N=5 and N=10 ad spaces.

As described above, some online advertising systems may provide targeted advertising based, for example, on contextual data and/or user data. Some targeted advertising techniques use the most-up-to-date contextual data and user data to enhance the value of the targeting, even at the expense of introducing significant latency into the execution of applications. In contrast, when pre-bid data are prefetched, the latency of application execution may be reduced, but the pre-bids may be based on contextual data and user data that are less precise or less up-to-date than the targeting data available at the time an instance of an ad space is available to be filled. For example, when pre-bid data for an ad space are prefetched, the contextual data may not include keywords from the content to be displayed proximate to the ad space, because the client device may not have determined, at the time the pre-bid data are prefetched, what content will be displayed.

Nevertheless, the inventors have recognized and appreciated that the value of targeted advertising is not greatly diminished by prefetching pre-bid data, because a large portion of the contextual data and user data that are generally used for targeted advertising are available prior to an instance of an ad space being available. The benefits of targeted advertising may be particularly insensitive to prefetching of pre-bid data for ad spaces that are included in mobile apps executing on mobile devices. Many mobile devices are primarily used by a single user, and the subject matter of content displayed by many mobile applications is generally known in advance. For these reasons, the user data and contextual data used for targeted advertising on mobile applications executing on mobile devices may be highly accurate, even when prefetching pre-bid data.

In some embodiments, the client device 920 may prefetch pre-bid data for multiple ad spaces simultaneously. For example, the client device 920 may transmit a message to the transaction manager 912 requesting pre-bid data for multiple ad spaces (e.g., all ad spaces) included in an application. The pre-bid request message may include shared contextual data that pertains to all the ad spaces for which pre-bids are requested (e.g., contextual data that identify the application, describe the subject matter of the application, indicate the date/time, etc.) and ad space-specific contextual data for each of the ad spaces for which a pre-bid is requested (e.g., contextual data that identify the ad space, the dimensions of the ad space, etc.). In response to the pre-bid request message, the client device 920 may receive a message from the transaction manager 912 including pre-bid data for each of the ad spaces identified in the pre-bid request message.

Prefetching pre-bid data for multiple ad spaces simultaneously may improve the functioning of the client device. For example, packaging the pre-bid requests and pre-bid data for N ad spaces into a single request message and response message can significantly reduce the latency of the pre-bidding process. Rather than perform N cycles of transmitting a pre-bid request, waiting for a response, and receiving a response including pre-bid data, the client device 920 can perform a single cycle of transmitting a bulk pre-bid request, waiting for a bulk response, and receiving a bulk response including pre-bid data for multiple ad spaces. Furthermore, in some embodiments, the transaction manager can perform pre-partner auctions for the N ad spaces in parallel. In this way, the latency of the pre-bidding process can be reduced by a factor of nearly N when the client device and the transaction manager implement bulk prefetching of pre-bid data for N ad spaces.

One of ordinary skill in the art will appreciate that bulk prefetching of pre-bid data can be implemented using any suitable technique. In some embodiments, rather than sending a single request message that includes requests for pre-bid data for multiple ad spaces and receiving a single response message that includes the requested pre-bid data, the client device can send N request messages in succession, without waiting for responses from the transaction manager, and the transaction manager can process the N requests in parallel and send N response messages.

Some embodiments of a method 900 for prefetching pre-bid data are described. In some embodiments, the method 900 may omit one or more of the steps illustrated in FIG. 9. For example, some embodiments of the method 300 may include steps 902 and 904, without necessarily including the other illustrated steps. As another example, some embodiments of the method 900 may include steps 902-908, without necessarily including the other illustrated steps.

Some embodiments have been described in which a client device displays advertisements, which are selected based on auctions and/or allocation processes performed on remote devices. In some embodiments, the client device may perform a pre-partner auction and/or post-partner auction.

In some embodiments, the client device 920 may beneficially implement the method 900 using parallel processing. For example, the client device 920 may execute a first thread that prefetches pre-bid data, and a second thread that allocates instances of ad spaces to advertisements (e.g., by communicating with an allocation manager) and displays advertisements in ad spaces. When the second thread determines that an instance of an ad space is available to fill, the second thread may determine whether pre-bid data for the ad space has been prefetched (e.g., by communicating with the first thread) and notify the first thread an instance of the ad space is being allocated to an advertisement. Based on the notification received from the second thread, the first thread may prefetch pre-bid data for the ad space, which may be used for allocation of the next instance of the ad space.

The techniques described herein may be beneficially applied to advertisements of any suitable format, including, without limitation, banner ads, interstitial ads, in-stream video ads, native ads, rewarded video ads, etc. In some embodiments, the prefetching techniques described herein may be beneficially applied to content other than advertisements.

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language resource), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a smart phone, a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending resources to and receiving resources from a device that is used by the user; for example, by sending web pages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. It should be understood that the order of steps or order for performing certain actions is immaterial so long as the systems and methods remains operable. In certain implementations, multitasking and parallel processing may be advantageous, as two or more steps or actions may be conducted simultaneously.

What is claimed is:

1. A method comprising:
   determining, by a processor of a client device, an initiation of an Internet session;
   determining, by the processor, a duration of the Internet session according to the determining of the initiation;
   determining, by the processor, a likelihood of activity triggering presentation of video content by a video player on the client device, wherein the determining the likelihood comprises predicting a time when selectable content will be displayed in one of a plurality of different portions of online content, wherein the determining the likelihood is based on the duration of the Internet session such that the likelihood of activity triggering the presentation of video content is higher the shorter the duration of the Internet session is, and wherein the selectable content enables access to the video content; and
   determining, by the processor, that the likelihood exceeds a threshold and, based thereon, performing at least one of the following steps before the activity triggers the presentation of the video content:
      initiating a mediation process to identify a digital video to be presented by the video player;
      unwrapping a video tag associated with the digital video;
      storing at least a portion of the digital video on the client device;
      stitching the digital video together with a second digital video; or
      initializing the video player for presenting the digital video on the client device.

2. The method of claim 1, wherein the online content comprises a web page, and wherein the predicting the time is based on a velocity associated with a scrolling of the web page and a distance associated with the different portions of the web page.

3. The method of claim 1, wherein the likelihood is determined based on a viewing history of a user, a viewing history of other users, and/or an Internet browser history.

4. The method of claim 1, wherein the selectable content comprises a link or an image.

5. The method of claim 1, comprising initiating the mediation process to identify the digital video before the activity triggers the presentation of the video content.

6. The method of claim 1, comprising unwrapping the video tag associated with the digital video before the activity triggers the presentation of the video content.

7. The method of claim 1, comprising storing at least the portion of the digital video on the client device before the activity triggers the presentation of the video content.

8. The method of claim 1, comprising stitching the digital video together with the second digital video before the activity triggers the presentation of the video content, wherein the activity comprises a selection of the online content, wherein the stitching occurs prior to the selection of the online content, and wherein the second digital video comprises an advertisement that is selected according to a winning bid.

9. The method of claim 1, comprising initializing the video player for displaying the digital video on the client device before the activity triggers the presentation of the video content.

10. The method of claim 1, further comprising:
performing by the client device:
determining whether to pre-fetch pre-bid data for an instance of an advertising space corresponding to a region of a graphical user interface, wherein the instance of the advertising space is not currently displayed by the client device;
based on a determination to prefetch the pre-bid data for the instance of the advertising space, prefetching the pre-bid data for the instance of the advertising space from a remote transaction manager, wherein the pre-bid data includes a pre-bid price offered for the instance of the advertising space; and
subsequent to prefetching the pre-bid data for the instance of the advertising space:
determining that the instance of the advertising space is available to fill;
sending the pre-bid price to an advertisement allocation manager;
receiving, from the advertisement allocation manager, allocation data indicative of a creative to be displayed in the instance of the advertising space; and
displaying the indicated creative in the instance of the advertising space,
wherein the prefetching of the pre-bid data comprises:
sending a message to the remote transaction manager, the message requesting a pre-bid for the instance of the advertising space, the message including data describing the advertising space; and
receiving, from the remote transaction manager, the pre-bid data for the instance of the advertising space,
wherein the pre-bid data further includes an ad tag corresponding to a particular creative,
wherein the ad tag includes a Uniform Resource Locator (URL) of the remote transaction manager and/or code for requesting the particular creative,
wherein the prefetching of the pre-bid data further comprises:
using the ad tag to send, to a remote server, a request for the particular creative; and
receiving, from the remote server, the particular creative,
subsequent to prefetching the pre-bid data:
determining that the indicated creative is the particular creative;
using the ad tag to send, to the remote server, a request for the particular creative;
receiving, from the remote server, the particular creative; and
notifying the remote transaction manager of the displaying of the indicated creative,
wherein the client device is a mobile device, and wherein the method is performed by a mobile application of the mobile device,
wherein determining whether to prefetch the pre-bid data is performed by the mobile application in response to the mobile application being launched,
wherein when the pre-bid data are second pre-bid data, determining whether to prefetch the second pre-bid data comprises:
determining an amount of time that has elapsed since first pre-bid data for the instance of the advertising space was prefetched; and
determining whether the time elapsed since prefetching the first pre-bid data exceeds a threshold period,
wherein when the pre-bid data are first pre-bid data, the allocation data further indicate that the instance of the advertising space is allocated to a pre-bid corresponding to the first pre-bid data, and wherein the method further comprises:
based on receiving the allocation data indicating that the instance of the advertising space is allocated to the pre-bid corresponding to the first pre-bid data, prefetching second pre-bid data for another instance of the advertising space; and
based on sending the pre-bid price of the first pre-bid data to the advertisement allocation manager, prefetching second pre-bid data for another instance of the advertising space,
wherein determining whether to prefetch the pre-bid data for the instance of the advertising space comprises:
predicting a likelihood of the client device displaying the region of the graphical user interface corresponding to the advertising space.

11. A system comprising:
a client device, the client device including a data processing apparatus programmed to perform operations, the operations including:
determining an initiation of an Internet session;
determining a duration of the Internet session according to the determining of the initiation;
determining a likelihood of activity triggering a presentation of video content by a video player on the client device, wherein the determining the likelihood comprises predicting a time when selectable content will be displayed in one of a plurality of different portions of online content based on scrolling by a user, and wherein the determining the likelihood is based on the duration of the Internet session such that the likelihood of activity triggering the presentation of video content is higher the shorter the duration of the Internet session is; and
determining that the likelihood exceeds a threshold and, based thereon, performing at least one of the following steps before the activity triggers the presentation of the video content by the video player:
initiating a mediation process to identify a digital video to be presented by the video player;
unwrapping a video tag associated with the digital video;
storing at least a portion of the digital video on the client device;

stitching the digital video together with a second digital video; or initializing the video player for presenting the digital video on the client device.

12. The system of claim 11, wherein the online content comprises a web page, and wherein the predicting the time is based on a velocity associated with the scrolling and based on a distance associated with the different portions of the web page.

13. The system of claim 11, wherein the likelihood is determined based on a viewing history of the user, a viewing history of other users, and/or an Internet browser history.

14. The system of claim 11, wherein the activity includes clicking a link, tapping the link, and/or viewing content associated with the video player.

15. The system of claim 11, wherein the operations comprise initiating the mediation process to identify the digital video before the activity triggers the presentation of the video content by the video player.

16. The system of claim 11, wherein the operations comprise unwrapping the video tag associated with the digital video before the activity triggers the presentation of the video content by the video player.

17. The system of claim 11, wherein the operations comprise storing at least the portion of the digital video on the client device before the activity triggers the presentation of the video content by the video player.

18. The system of claim 11, wherein the operations comprise stitching the digital video together with the second digital video before the activity triggers the presentation of the video content by the video player and initializing the video player for displaying the digital video on the client device before the activity triggers the presentation of the video content by the video player.

19. A non-transitory computer storage medium having instructions stored thereon that, when executed by a data processing apparatus, cause the data processing apparatus to perform operations, the operations including:

determining an initiation of an Internet session;

determining a duration of the Internet session according to the determining of the initiation;

determining a likelihood of activity triggering presentation of video content by a video player on a client device, wherein the determining the likelihood comprises predicting a time when selectable content will be displayed in one of a plurality of different portions of online digital content, wherein the determining the likelihood is based on the duration of the Internet session such that the likelihood of activity triggering the presentation of video content is higher the shorter the duration of the Internet session is, wherein the selectable content enables access to the video content; and determining that the likelihood exceeds a threshold and, based thereon, performing at least one of the following steps before the activity triggers the presentation of the video content:

initiating a mediation process to identify a digital video to be presented by the video player;

unwrapping a video tag associated with the digital video;

storing at least a portion of the digital video on the client device;

stitching the digital video together with a second digital video; or initializing the video player for presenting the digital video on the client device.

20. The non-transitory computer storage medium of claim 19, wherein the predicting the time is based on a distance associated with the different portions of the online digital content, wherein the likelihood is determined based on a viewing history of a user of the client device, a viewing history of other users, and/or an Internet browser history, and wherein the activity includes clicking a link, tapping the link, and/or viewing content associated with the video player.

* * * * *